United States Patent
Liew et al.

(10) Patent No.: US 9,425,886 B2
(45) Date of Patent: *Aug. 23, 2016

(54) NETWORK-CODING BUILDING BLOCKS AND DECOMPOSITION SCHEDULING BASED THEREON

(71) Applicant: The Chinese University of Hong Kong, Shatin, New Territories (CN)

(72) Inventors: Soung Chang Liew, Sha Tin (CN); Jianghao He, Sha Tin (CN)

(73) Assignee: The Chinese University of Hong Kong, Shatin, New Territories, Hong Kong (CN)

( * ) Notice: Subject to any disclaimer, the term of this patent is extended or adjusted under 35 U.S.C. 154(b) by 4 days.

This patent is subject to a terminal disclaimer.

(21) Appl. No.: 14/748,099

(22) Filed: Jun. 23, 2015

(65) Prior Publication Data

US 2015/0372748 A1    Dec. 24, 2015

Related U.S. Application Data

(63) Continuation of application No. 13/778,982, filed on Feb. 27, 2013, now Pat. No. 9,094,994.

(51) Int. Cl.
| | |
|---|---|
| *H04B 7/155* | (2006.01) |
| *H04W 72/12* | (2009.01) |
| *H04L 12/721* | (2013.01) |
| *H04L 12/801* | (2013.01) |

(Continued)

(52) U.S. Cl.
CPC ........... *H04B 7/15521* (2013.01); *H04L 45/06* (2013.01); *H04L 47/10* (2013.01); *H04L 47/41* (2013.01); *H04W 72/0446* (2013.01); *H04W 72/1231* (2013.01)

(58) Field of Classification Search
None
See application file for complete search history.

(56) References Cited

U.S. PATENT DOCUMENTS

| | | |
|---|---|---|
| 9,094,994 B2 | 7/2015 | Liew et al. |
| 2009/0147731 A1* | 6/2009 | Chion et al. .................. 370/328 |

(Continued)

OTHER PUBLICATIONS

J. He, S. C. Liew, "Building Blocks of Physical-layer Network Coding," IEEE Sensor, Mesh and Ad Hoc Communications and Networks (SECON), Jun. 24-27, 2013.

(Continued)

*Primary Examiner* — Hassan Kizou
*Assistant Examiner* — Roberta A Shand
(74) *Attorney, Agent, or Firm* — Kilpatrick Townsend & Stockton LLP; Kenneth R. Allen

(57) ABSTRACT

Methods and systems involving network coding (NC) atoms as building blocks of NC networks solve the scheduling problem in NC networks using a decomposition framework based on NC atoms. Ten physical-layer network coding (PNC) atoms and their straightforward network coding (SNC) counterparts are disclosed. SNC network can generate a transmission schedule based on SNC atoms. PNC network can generate transmission schedule based on PNC atoms. Performance evaluation results indicate that decomposition based on PNC atoms outperforms the traditional multi-hop (non-NC) scheduling by about 100% and can yield performance gain of 40% or more compared with decomposition based on the PNC TWRC atom alone. Further performance evaluation results indicate that decomposition based on SNC atoms outperforms the traditional multi-hop (non-NC) scheduling by about 33% and can yield performance gain of 14% or more compared with decomposition based on the SNC TWRC atom alone.

17 Claims, 27 Drawing Sheets

(51) Int. Cl.
*H04L 12/891* (2013.01)
*H04W 72/04* (2009.01)

(56) References Cited

U.S. PATENT DOCUMENTS

| | | | |
|---|---|---|---|
| 2010/0027458 A1* | 2/2010 | Wu et al. .................. | 370/315 |
| 2010/0254300 A1* | 10/2010 | Gulasekaran et al. ........ | 370/315 |
| 2012/0030536 A1* | 2/2012 | Fisher-Jeffes et al. ....... | 714/755 |
| 2012/0207193 A1 | 8/2012 | Kim et al. | |
| 2012/0300692 A1 | 11/2012 | Sfar et al. | |
| 2013/0039265 A1 | 2/2013 | Shin et al. | |
| 2013/0077555 A1 | 3/2013 | Gao et al. | |
| 2013/0265872 A1 | 10/2013 | Noh et al. | |
| 2014/0241404 A1 | 8/2014 | Liew et al. | |

OTHER PUBLICATIONS

J. He, S. C. Liew, "Building Blocks of Physical-layer Network Coding," IEEE transaction on Wireless Communication, vol. 14, Issue: 5, 2015 (publication date Jan. 12, 2015) (submitted on Dec. 6, 2013).

S. Zhang, S. Liew, and P. Lam, "Physical layer network coding," ACM Mobicom'06, 2006, 8 pages.

Y. Wu, P. A. Chou, and S. Y. Kung, "Information Exchange in Wireless Networks with Network Coding and Physical Layer Broadcast," Annual Conf. Inform. Sci. and Systems (CISS), 2005, 6 pages.

W. Nam, S.Y. Chung, Y.H. Lee "Capacity of the Gaussian Two-way Relay Channel to within 1/2 bit," IEEE Trans. Info. Theory, vol. 56, No. 11, pp. 5488-5495, Nov. 2010.

M. Effros, T. Ho, and S. Kim, "A tiling approach to network code design for wireless networks," in Proc. IEEE Information Theory Workshop, Punta del Este, Uruguay, 2006, pp. 62-66.

H. Saffar and P. Mitran, "Capacity Bounds and Lattice Coding for the Star Relay Network", 2010, preprint: arXiv:1001.3708, 5 pages.

B. Ni, N. Santhapuri, Z. Zhong and S. Nelakuditi. "Routing with Opportunistically Coded Exchanges in Wireless Mesh Networks." Poster session of SECON'06, 2006, 3 pages.

S. Zhang, S. Liew, "Applying Physical Layer Network Coding in Wireless Networks," Eurasip J. Wirel. Commun. Netw, vol. 2010, Article ID 870268, 12 pages, 2010.

P. Popovski and H. Yomo, "Bi-directional amplification of throughput in a wireless multi-hop network," in IEEE 63rd Vehicular Technology Conference (VTC), Melbourne, Australia, May 2006.

S. C. Liew, S. Zhang, and L. Lu "Physical-layer Network Coding: Tutorial, Survey, and Beyond," invited paper to appear in Phycom, http://dx.doi.org/10.1016/j.phycom.2012.05.002, 39 pages.

J, Goseling, M. Gastpar, and J. H. Weber, "Line and Lattice Networks Under Deterministic Interference Models" IEEE Transactions on Information Theory, vol. 57, No. 5, May 2011, 20 pages.

C. Chen, K. Cai, and H. Xiang, "Scalable ad hoc networks for arbitrary-cast: practical broadcast-relay transmission strategy leveraging physical-layer network coding," EURASIP Journal on Wireless Communications and Networking, vol. 2008, 15 pages.

S. Katti, S. Gollakota, D. Katabi, "Embracing wireless interference: Analog network coding," in Proc. ACM SIGCOMM 2007, 12 pages.

L. Lu, S.C. Liew, "Asynchronous physical-layer network coding" IEEE Trans. Wireless Commun. 11 (2) (2012) 819-831.

\* cited by examiner

TIME SLOTS CONSUMED BY PNC, SNC AND NON-NC
SCHEMES UNDER EACH ATOM

2400

| Scheme | Parameter: Traffic Volume $K$ | | | | | |
|---|---|---|---|---|---|---|
| | $K=10$ | | $K=100$ | | $K=1000$ | |
| | Mean (TS) | RSD | Mean (TS) | RSD | Mean (TS) | RSD |
| PNC-10 | 13.7 | 13% | 103.2 | 5% | 988.4 | 0.8% |
| SNC-10 | 16.5 | 5% | 148.3 | 3% | 1449.5 | 1.6% |
| PNC-TWRC | 19.8 | 3% | 183.1 | 2% | 1378.8 | 1.6% |
| Non-NC | 20.0 | 0.0 | 200.0 | 0.0 | 2000.0 | 0.0 |

| Scheme | Parameter: Traffic Volume K | | |
|---|---|---|---|
| | K=10 (TS) | K=100 (TS) | K=1000 (TS) |
| PNC-4 | 18.9 | 173.2 | 1260.7 |
| PNC-5 | 14.5 | 107.7 | 989.4 |
| PNC-10 | 13.7 | 103.2 | 988.4 |

2510

| DatabaseType | Parameter: Traffic Volume K | | | | | |
|---|---|---|---|---|---|---|
| | K=10 (TS) | (AI) | K=100 (TS) | (AI) | K=1000 (TS) | (AI) |
| PNC-5-R | 14.3 | 16.1 | 107 | 645 | 990 | 14074 |
| PNC-10-R | 13.9 | 17.3 | 104 | 857 | 988 | 28051 |
| PNC-10 | 13.7 | 38463 | 103 | 38463 | 988 | 38463 |

*FIG. 25*

NETWORK-CODING BUILDING BLOCKS AND DECOMPOSITION SCHEDULING BASED THEREON

CROSS REFERENCE TO RELATED APPLICATIONS

The application is a continuation of U.S. patent application Ser. No. 13/778,982 filed Feb. 27, 2013, now U.S. Pat. No. 9,094,994.

BACKGROUND OF THE INVENTION

This application relates to digital data communication and more particularly to physical-layer network coding (PNC) and straightforward network coding (SNC). Since the conception of physical-layer network coding (PNC), it has developed into a subfield of network coding that has been under intensive study. Most of the investigations to date have focused on the simplest setup in which PNC can be applied, namely the two-way-relay channel (TWRC). Studies of the application of PNC in general networks are relatively few. What is needed are options to exploit the underlying advantages of physical layer coding in a variety of network configurations.

SUMMARY OF THE INVENTION

According to the invention, methods and systems related to network coding (NC) atoms provide building blocks for NC networks in order to solve the scheduling problem in NC networks using a decomposition framework based on NC atoms. In this document, the term "NC atoms" (or simply "atoms") refers to both "physical-layer network coding (PNC) atoms" and "straightforward network coding (SNC) atoms" at the same time. The specific terms "PNC atoms" and "SNC atoms" will be used when only one of them is being referred to.

Ten PNC atoms and their SNC atoms are disclosed. Performance evaluation results indicate that decomposition based on the ten PNC atoms outperforms the traditional multi-hop (non-NC) scheduling by about 100%. Furthermore, decomposition based on the ten PNC atoms can yield performance gain of 40% or more compared with decomposition based on the PNC TWRC atom alone. It is further shown that decomposition based on five of the atoms yields performance that is almost as good as decomposition based on all ten atoms. The complexity of decomposition is reduced greatly as a result. Performance evaluation results indicate that decomposition based on the disclosed class of SNC atoms outperforms the traditional multi-hop (non-NC) scheduling by about 33%. Furthermore, decomposition based on such SNC atoms can yield performance gain of 14% or more compared with decomposition based on the SNC TWRC atom alone.

In some embodiments, a data communication method for scheduling transmissions between the plurality of nodes in a network is presented. The method may include identifying a plurality of NC atoms in a digital telecommunications network, the plurality of NC atoms specifying how transmission traffic flows between a plurality of nodes and at least one relay, wherein each of the plurality of NC atoms comprises at least some of the plurality of nodes and the at least one relay in the network, and wherein each of the plurality of NC atoms cannot be decomposed to any other NC atom or a combination of other NC atoms in terms of the transmission pattern of the atom. The method may also include generating a transmission schedule using the plurality of NC atoms. The method may also include relaying transmission traffic between the plurality of nodes using the transmission schedule.

In some embodiments, SNC networks (networks built based on SNC atoms) can generate a transmission schedule using the plurality of SNC atoms. PNC networks (networks built based on PNC atoms) can generate transmission schedule using the plurality of PNC atoms.

In some embodiments, each of the plurality of PNC atoms includes a connectivity and interference attribute, a traffic flow attribute, and a transmission pattern attribute. In some embodiments, the plurality of PNC atoms includes at least one of: a bidirectional cross atom, a triangle atom, a wedge atom, an asymmetric star atom, a first special two way relay channel atom, and a second special two way relay channel atom.

In some embodiments, each of the plurality of SNC atoms includes a connectivity attribute, a traffic flow attribute, and a transmission pattern attribute. In some embodiments, the plurality of SNC atoms includes at least one of: a bidirectional cross atom, a triangle atom, a wedge atom, an asymmetric star atom, a first special two way relay channel atom, and a second special two way relay channel atom.

In some embodiments of NC atoms (i.e., SNC atoms or PNC atoms), generating the transmission schedule includes determining a minimum number of time slots necessary to schedule traffic between the plurality of nodes. In some embodiments, identifying the plurality of NC atoms includes, for each of the plurality of NC atoms identified, determining whether a combination of node pairs among the plurality of nodes in the network satisfies a connectivity-interference (CI) requirement (in this document, we will simply use the term "CI requirement" with the understanding that PNC atoms have both connectivity and interference-free requirements and SNC atoms have only connectivity but not the interference-free requirement). In some embodiments, determining whether the combination of node pairs satisfies the CI requirement includes performing a connectivity check and an interference-free check. In some embodiments, performing the connectivity check includes determining whether a subset of nodes of the at least some of the plurality of nodes are connected to each other without requiring transmission through the at least one relay. In other embodiments, performing the connectivity check includes determining whether a distance between nodes of the at least some of the plurality of nodes is smaller than or equal to a transmission range threshold. In some embodiments, the connectivity check may be based on determining whether a signal power received by a receiving node from a transmitting node is above a certain threshold.

In other embodiments, performing the interference-free check of PNC atoms includes determining whether transmission between a first node pair among the combination of node pairs will not interfere during simultaneous transmission between a second node pair among the combination of node pairs.

In other embodiments of PNC atoms, performing the interference-free check includes the following steps: computing a first distance between a first node pair among the combination of node pairs; computing a second distance between the transmitting node of a second node pair and the receiving node of the first node pair among the combination of node pairs; and determining if the second distance is larger than the first distance multiplied by a scalar value greater than 1. In other embodiments, performing the interference-free check includes the following alternative steps:

computing a first power received by the receiving node from the transmitting node in the first node pair; computing a second power received by the receiving node of the first node pair from the transmitting node of the second node pair; and determining if the first power is larger than second power by a factor of a scalar value greater than 1.

In some embodiments of NC atoms, generating the transmission schedule includes storing information about each of the plurality of NC atoms in a database. In some embodiments, generating the transmission schedule includes computing a linear program utilizing the database of the plurality of NC atoms subject to constraints to minimize the number of time slots needed to meet traffic demand.

BRIEF DESCRIPTION OF THE DRAWINGS

FIG. 24 is an example illustration of performance advantages according to some embodiments.

FIG. 25 is another example illustration of performance advantages according to some embodiments.

DETAILED DESCRIPTION OF THE INVENTION

Embodiments of the present invention disclose building blocks of physical-layer network coding (PNC). The present disclosures discuss how PNC building blocks can be used to decompose the transmission scheduling problem in wireless networks. Ten PNC building blocks are disclosed, as well as how combinations of these ten PNC building blocks can boost throughput in wireless networks significantly. Additionally, methods for generating transmission schedules using any or all of the building blocks, as well as methods for controlling transmission traffic using such schedules, are disclosed. Furthermore, building block for straightforward network coding (SNC), which may be considered as related counterparts to the PNC building blocks, are disclosed.

To date PNC research results have focused on the simplest setup in which PNC can be applied, namely the two-way-relay channel (TWRC). Disclosures of the application of PNC in general networks are relatively few. The present disclosures herein describe methods, systems, and apparatuses related to PNC and SNC that fill in many gaps previously undisclosed. For example, two general areas of disclosure are described herein:

First, a general network can be decomposed into small building blocks of NC atoms (PNC atoms and/or SNC atoms) for scheduling purposes. These building blocks may be referred to as "PNC atoms" and "SNC atoms" respectively because they cannot be further decomposed into smaller building blocks.

Figure 2:
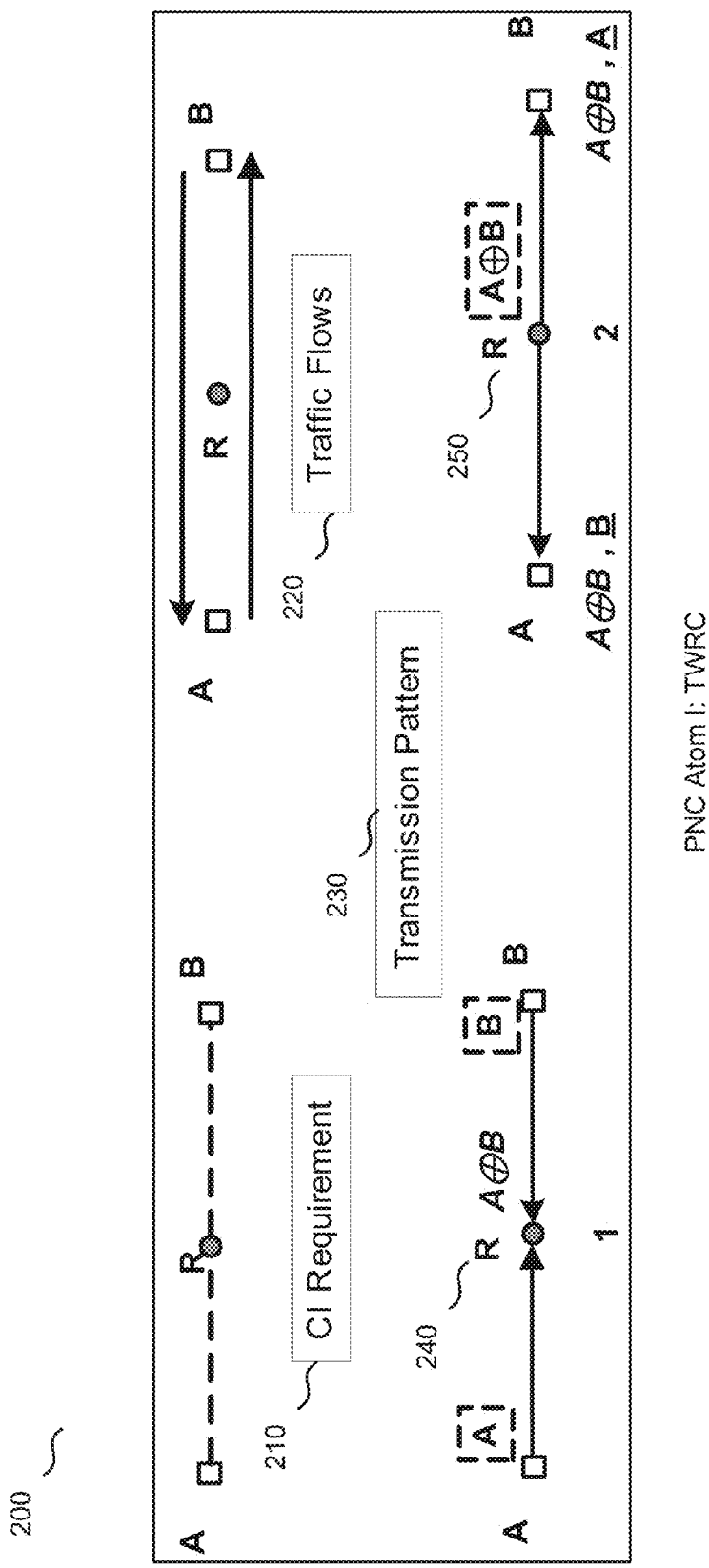
FIG. 2 is an illustration of a physical-layer network coding (PNC) atom in a two-way relay channel (TWRC) configuration.

Second, TWRC is only one of many PNC atoms. Refer to FIG. 2 for an illustration of the TWRC atom. Besides PNC TWRC, nine other PNC atoms are disclosed herein, though many more may be available, which may be patterned off of the present disclosures according to those with skill in the art. Descriptions for the ten PNC atoms, as well as analogous SNC atoms, are disclosed. Additionally, example methods for generating a transmission schedule using the atoms are disclosed.

PNC scheduling according to the present disclosures can significantly outperform scheduling based on the traditional multi-hop scheme (non-NC) and the straightforward network coding scheme (SNC) that performs network coding at the higher layer. For example, compared with non-NC, PNC achieves roughly the same throughput gain (~100%) in general networks as it does in the simple TWRC network under heavy traffic loading. In addition, the present disclosures establish that PNC decomposition based on a variety of different PNC atoms yield much better performance than PNC decomposition based on the TWRC atom alone.

Figure 1:
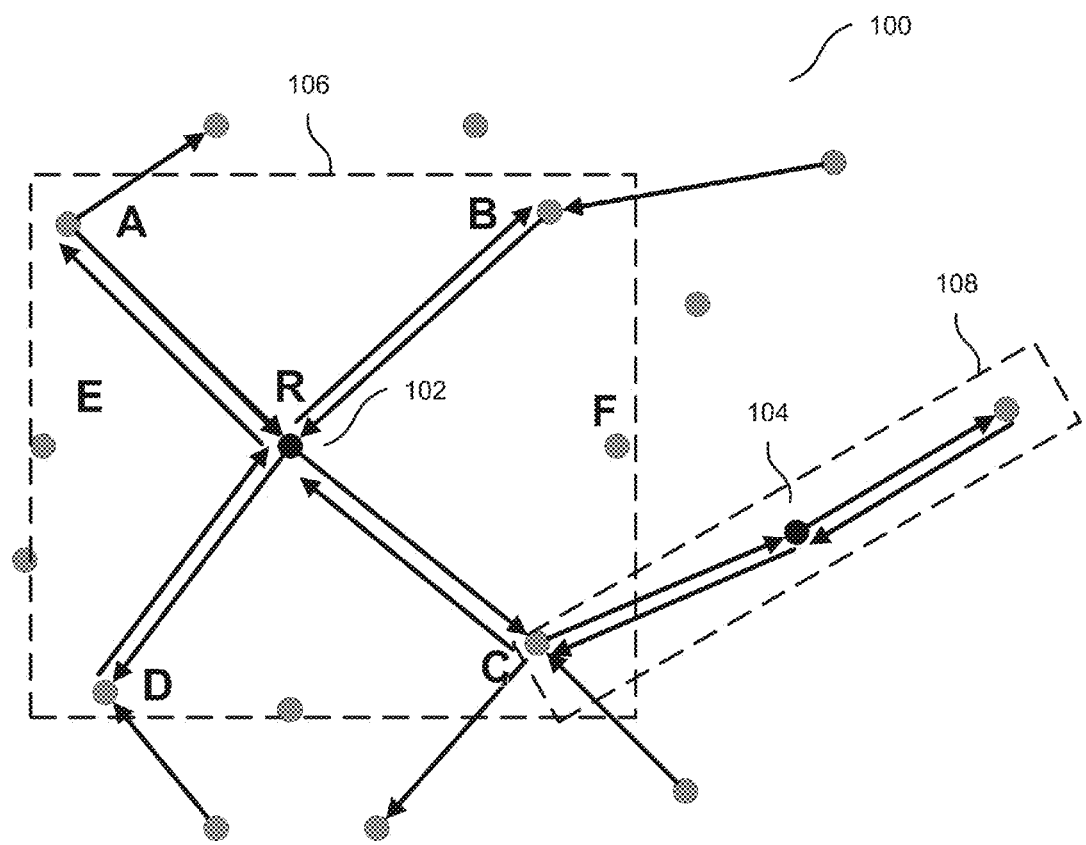
FIG. 1 illustrates an example network with multiple nodes and a transmission relay.

To start with, an example network is illustrated in FIG. 1 and described herein. In a large general network, there could be many end-to-end traffic flows. Different flows may cross paths at various relay nodes. FIG. 1 shows five end-to-end flows in a network. From the perspective of a relay node, each flow traversing it comes from a one-hop neighbor node and the traffic of the flow is destined for another one-hop neighbor. For example, for the relay 102 labeled R in FIG. 1, there is a flow from neighbor A to neighbor C. The relay 102 and its one-hop neighbors form a "local network." Two examples of local networks are enclosed in the two rectangular frames 106 and 108 in FIG. 1, with relays 102 and 104, respectively. The sources and the destinations of traffic flows within a local network are one-hop neighbors of the associated relays.

In the context of the overall network, routes taken by the flows may be predetermined by a separate routing algorithm, the techniques of which may be implemented using known methods in the art. Rather, the present disclosures focus on how to schedule the transmissions of flows given their fixed routes. In a general network, the number of time slots needed to satisfy the traffic demands of all flows is often determined by the "bottleneck" relay with the most traffic crossing it. Thus, the present disclosures may focus on the scheduling problem faced by the bottleneck relay.

Referring still to FIG. 1, consider the left local network 106 enclosed in the square frame and suppose that node R 102 is the bottleneck relay. Here, there are four flows crossing the relay. In an example, suppose that there are two packets to be delivered from node A to node C; two packets from C to A; one packet from B to D; and one packet from D to B. One may be able to determine that there are two TWRCs embedded in this local network: A-R-C and B-R-D. With the TWRC structure, PNC requires two time slots for two nodes to exchange one packet with each other. Here, for example, in FIG. 1, two time slots are needed to deliver one packet from B to D and one packet from D to B. Thus, for the six packets above, using PNC TWRC decomposition, two time slots are needed to deliver the two packets between B and D, and additional four time slots to deliver the four packets between A and C. Overall, the TWRC decomposition requires a total of six time slots.

Figure 3:
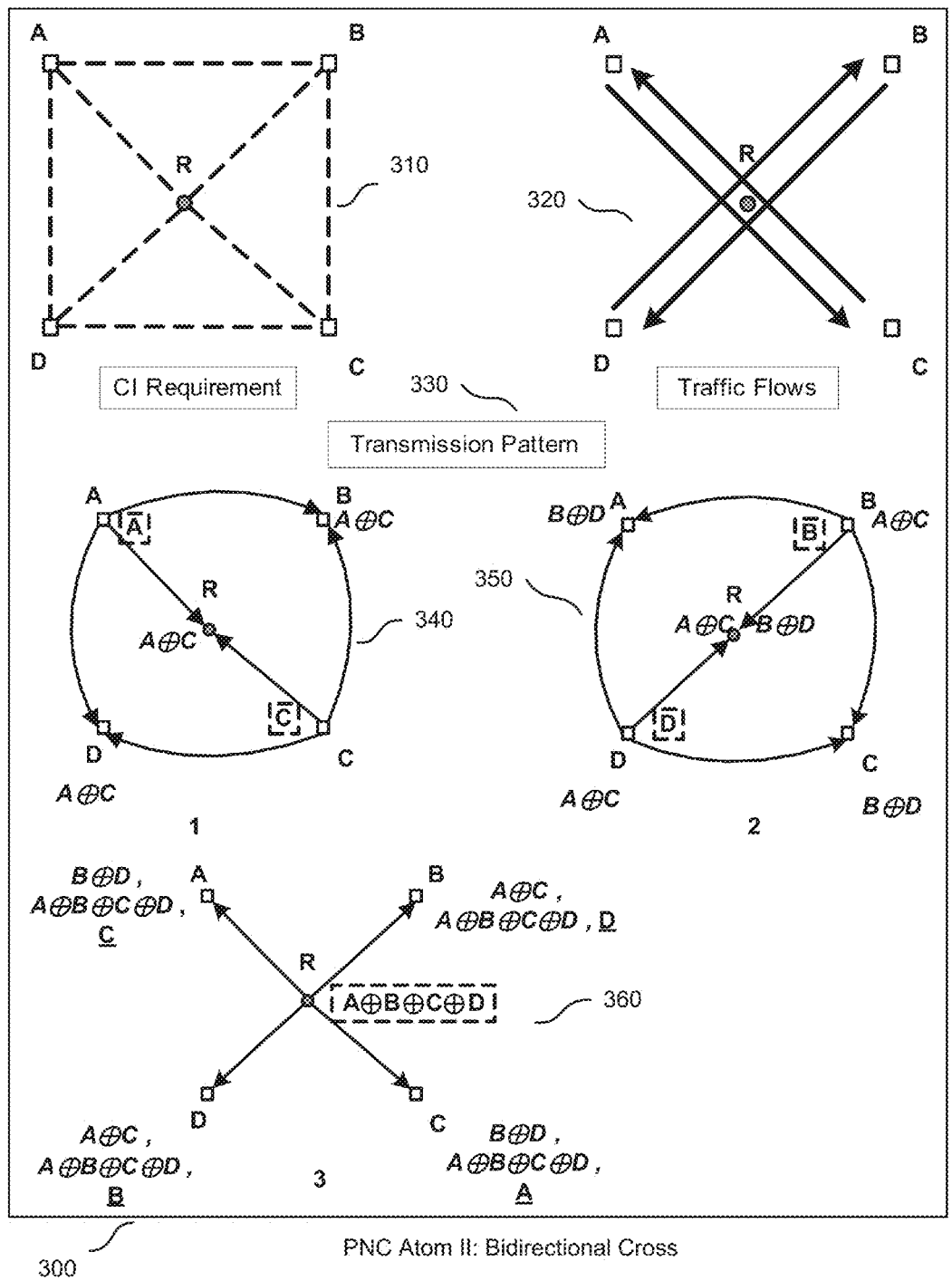
FIG. 3 is an illustration of a PNC atom in a bidirectional cross configuration.

A solution requiring only five time slots is as follows and is consistent with embodiments of the present invention. For example, suppose that nodes A and C of FIG. 1 can overhear the transmissions of nodes B and D, and nodes B and D can overhear the transmissions of nodes A and C. The lower three diagrams in FIG. 3 show a three slot transmission pattern for nodes A and C to exchange one packet with each other, and for B and D to exchange one packet with each other. As will be discussed more in the discussion of the individual atoms, the regular font in the figures denotes the label nodes and the italic font denotes the label packets sent by the nodes. As shown in FIG. 3, in the first time slot, nodes A and C transmit packets A and C, respectively. With the PNC mechanism, nodes R, B, and D receive packet A⊕C. In the second time slot, nodes B and D transmit packets B and D, respectively. Nodes R, A, and C receive packet B⊕D. In the third time slot, relay R XORs A⊕C and B⊕D to transmit A⊕B⊕C⊕D, which is received by nodes A, B, C, and D. Each of the nodes A, B, C, and D could extract its target packet. For example, the target packet of node A is packet C. It can extract packet C according to the following logic: (A⊕B⊕C⊕D)⊕(B⊕D)⊕A=C. After the above three time slots, there is still one packet from A to C and one packet from C to A to deliver. A simple TWRC A-R-C may be used to deliver these remaining packets in two time slots. Thus, altogether only five time slots are consumed.

The bidirectional cross structure in FIG. 3 is a PNC building block that is different from TWRC. Note that the three-slot transmission pattern is distinct from the pair of two-slot transmission patterns of the TWRCs A-R-C and B-R-D, although they deliver the same four packets. Reference may be made to FIG. 2 for an illustration of the TWRC atom. Also, it may be apparent, with more discussion below, that the three-slot transmission pattern cannot be further broken down to an assembly of transmission patterns of other PNC building blocks. Thus, similarly, ten PNC building blocks are disclosed herein, where each building block cannot be decomposed into simpler building blocks, e.g. to any other building block disclosed herein. These building blocks may be referred to as PNC atoms because the transmission pattern of each of them cannot be decomposed into those of other PNC atoms. The previous two paragraphs show that decomposition based on bidirectional cross and TWRC is more efficient than decomposition based on TWRC alone. Thus, one advantage of embodiments of the present invention is that decomposition based on a variety of different PNC atoms is in general much more efficient than decomposition based on TWRC alone.

The rest of the disclosures are organized as follows. Section I describes general properties of PNC atoms formally as entities consisting of three attributes. A more complete and specific description of attributes of the ten PNC atoms presented herein are discussed in Section II, with corresponding FIGS. 2-11. Section III provides a more complete and specific description of attributes of SNC atoms, with corresponding FIGS. 12-20. Section IV discusses the problem of network scheduling and provides subsequent solutions, including methods and apparatuses for generating an optimal transmission schedule using atoms, according to some embodiments. Section V describes some advantages over traditional methods. Section VI provides verification and logical proof of some of the assertions provided in these disclosures.

I. PNC Atoms

Broadly speaking, a PNC atom specifies how the traffic among a group of nodes (sometimes referred to as the peripheral nodes) around a relay can be delivered via the relay using PNC. Given the local topology around a relay, PNC atoms may be formed to facilitate the traffic delivery.

Attributes of PNC Atoms

Each PNC atom may be defined by three attributes. Each attribute can be described by a diagram, with the specific properties of each attribute varying, which as shown in FIGS. 2-11. In general, the three attributes are discussed herein:

(1) Connectivity-Interference (CI) Requirement

The first attribute of an atom is the connectivity and interference relationships among its peripheral nodes. These relationships can be modeled by a graph, referred to as the CI requirement graph (CI-graph). These requirements must be satisfied for an associated transmission pattern (described in (3), below) to work.

Connectivity Requirement:

Two nodes are connected by a connectivity edge (C-edge), represented by a dashed line in FIGS. 2-11, if they are required to be within the transmission range of each other for purposes of identifying that particular atom.

In some embodiments, a relay R in a PNC atom should be within the transmission range of all peripheral nodes. Indeed, if a relay were not connected to the peripheral nodes, it could not function as their relay. Two peripheral nodes, on the other hand, may or may not be connected; a C-edge between two peripheral nodes indicates that they could overhear each other.

Interference Free Requirement:

Two nodes are connected by an interference-free requirement edge (I-edge), represented by a dashed-dotted line in FIGS. 2-11, if they are out of the interference range of each other. This requirement will guarantee that one node can successfully receive a packet without being interfered by another simultaneous transmission. For example, in FIG. 6, nodes A and B simultaneously transmit in first time slot; D must be out of the interference range of B for it to receive successfully from A. Also for example, note that atoms I to IV (FIGS. 2-5) do not have I-edges in their CI-graphs, while atoms V to X (FIGS. 6-11) do.

Note that the CI-graph only states the required conditions for the associated transmission pattern (described in (3)) to work and to fit the characteristics of that specified atom. The absence of a C-edge between two nodes does not mean that they are out of the transmission range of each other. Similarly, the absence of an I-edge between them does not mean that they are within the interference range of each other. The absence of an edge between two nodes only means that the associated relationship does not matter as far as the transmission pattern is concerned. In other words, in some embodiments, more nodes may be interference-free than specified, and more nodes may be connected to each other than specified. Embodiments are not so limited.

(2) Traffic Flows

A second attribute of an atom is the traffic that it can deliver. In an atom, the relay assists the delivery of the traffic among the peripheral nodes. The traffic flow from a source peripheral node to a destination peripheral node that the atom can support is represented by a solid directed line in a single graphical flow for each atom specified in FIGS. 2-11, and labeled with the subtitle "Traffic Flows."

In some embodiments, the transmission ultimate transmission destination from a starting node should be somewhere outside the transmission range of the starting node. Note that this is reasonable of the physical situation of interest to where the atoms may be most effective. If the destination were within the transmission range of the source, the source could transmit directly to the destination without the help of the relay. Certainly, the atoms discussed herein may be used in those cases as well, but not all of the advantages of the atoms may be realized in those instances.

(3) Transmission Pattern

A third attribute of an atom is the transmission pattern (and the accompanying PNC mechanisms) used to deliver one packet for each traffic flow of the atom. A transmission pattern includes a number of time slots. In each time slot, some nodes transmit and some nodes receive. The packets transmitted by the transmitting nodes and the packets received by the receiving nodes may be specified in the transmission pattern. In some embodiments, to simplify the reception (and overhearing) mechanism at the nodes, a node cannot transmit and receive at the same time. This specification may sometimes be called half duplexity.

The relay node may participate either as a receiving node or a transmitting node in all time slots. Accordingly, the transmission pattern may be divided into two phases: i) In the uplink phase, the relay receives. The source nodes of flows send either their native packets or network-coded packets including their native packets mixed with overheard packets from other source nodes. ii) In the downlink phase, the relay transmits network-coded packets.

The existence of a C-edge between two nodes means that they are neighbors who can "hear" each other. Thus, it is reasonable to conclude that if two neighbors of a node transmit in the same time slot, provided the node is not transmitting itself, it can derive a network-coded packet from the simultaneously received signals using the PNC mechanism.

Note that the transmission pattern of any particular atom should be designed based on the connectivity and interference-free relationships given in the CI graph. Although the lack of a C-edge between two nodes does not necessarily mean the two nodes cannot hear each other, it is not assumed or known the nodes can hear each other either. The lack of a C-edge just means it is not a given that the two nodes can hear each other. Thus, design of the transmission pattern for any particular atom should include at least the given relationships captured in the CI-graph in the respective figures provided herein. In other words, in some embodiments, more C-edges may be present than shown, but embodiments are not so limited.

A transmitting node may combine several previously received packets to transmit a network-coded packet. For example, in the last time slot (i.e. time slot 3) in FIG. 3, relay R combines B⊕D with A⊕C to transmit A⊕B⊕C⊕D.

In practice, it is complex for the relay to decode a network-coded packet of three or more simultaneous signals, although this is possible in theory. Thus, in some embodiments, in the uplink phase, at most two source nodes transmit together in the same time slot. In other embodiments, more than two source nodes may transmit in the same time slot.

II. Ten PNC Atoms

FIGS. 2-11 illustrate ten PNC atoms together with their three attributes. Since FIG. 2 illustrates PNC atom I, a TWRC atom, and may be considered known in industry, a detailed description of atom I beyond what is already discussed will not be provided herein.

Description of PNC Atom II: Bidirectional Cross

Referring to FIG. 3, the graphical illustration 300 shows PNC atom II, a bidirectional cross. Here, there are four nodes, i.e. {A, B, C, D}, and one relay R. The nodes may be arranged in a box-like fashion around the relay, but at the least, the CI requirement 310 for PNC atom II specifies that a first node A is in transmission range of second node B and fourth node D and relay R, node B is in transmission range of node A and third node C and relay R, and node C is in transmission range of node B, node D and relay R.

The traffic flows requirement 320 for PNC atom II specifies two bi-directional flows through relay R: one to and from nodes A and C, and the other to and from nodes B and D. In other words, there is a data unit from node A to node C, and a data unit from node C to node A; and there is a data unit from node B to node D, and a data unit from node D to node B. The deliveries of these data units are facilitated by relay R, as specified by the transmission pattern of PNC atom II.

The transmission pattern 330 for PNC atom II may have three distinct operations, each occurring in a successive time slot. In the first operation (time slot) 340, node A and node C transmit their respective packets, packet A and packet C. With the satisfaction of the CI requirement and with the physical-layer network coding mechanism, node B, node D, and relay R all receive a network-coded message containing a mixture of packets A and C. In FIG. 3, this network-coded message is shown as the bitwise exclusive-OR (XOR) of packets A and C. However, in general other network coding operations are possible. In some embodiments, one property of the network-coded message as a function of packets A and C, denoted by f(A, C) herein, is that it is possible to obtain packet A using f(A, C) and packet C; and it is possible to obtain packet C using f(A, C) and packet A. By way of example, suppose that XOR is used as the network coding operation, then f(A, C)=A XOR C. To obtain packet A from f(A, C) and packet C, the following extraction may be conducted: A=f(A, C) XOR C=A XOR C XOR C. In other embodiments, other network coding operations are possible besides bitwise exclusive-OR so long as the aforementioned property as discussed above is satisfied. By way of an example implementation, the use of XOR may be discussed throughout the descriptions, though other types of operations may be used. Thus, at the end of the first operation (time slot) 340, node B, node D, and relay R all receive message A XOR C.

In the second operation (time slot) 350, node B and node D transmit their respective packets, packet B and packet D. With the satisfaction of the CI requirement and with the physical-layer network coding mechanism, node A, node C, and relay R all receive message B XOR D.

In the third operation (time slot) 360, relay R combines message A XOR C, and the message B XOR D, to form message A XOR C XOR B XOR D. For the sake of clarity and notation, a packet containing a combined message similar or analogous to this may be referred to as a mixture packet or a combined packet. This mixture packet containing this message is then broadcasted to nodes A, B, C, and D. Upon receiving this message, node A uses its self-information (i.e., packet A), the previous network-coded message it received in the second operation (i.e., B XOR D), together with this message (i.e., A XOR C XOR B XOR D), to extract message C=A XOR (B XOR D) XOR (A XOR C XOR B XOR D). This is the packet to be delivered from node C to node A according to the traffic flows specification for PNC atom II. In a similar fashion, node C can extract message A, node B can extract message D, and node D can extract message B. Example logic used to successfully extract each node's respective data packet is shown in the third operation 360 and may follow analogous logic as described herein.

Thus, PNC atom II the bidirectional cross can complete transmission of the aforementioned traffic flows in 3 time slots. In contrast, a conventional transmission schedule of the prior art would complete the same transmissions in 4 time slots using two PNC TWRC, and 8 time slots using the traditional store-and-forward scheme.

Description of PNC Atom III: Triangle and PNC Atom IV: Wedge

Figure 4A:
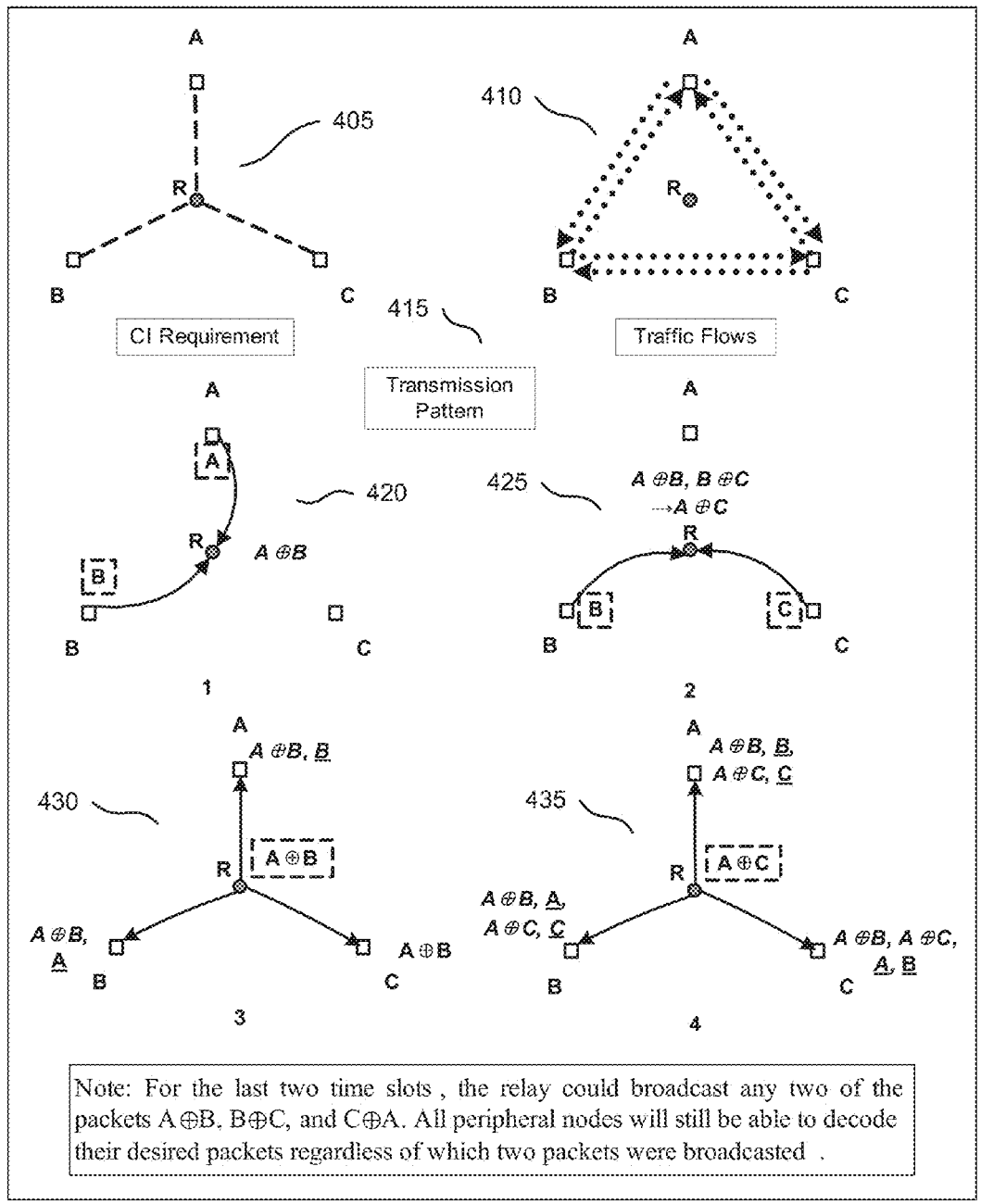
FIG. 4A is an illustration of a broadcast model of a triangular network.
Figure 4B:
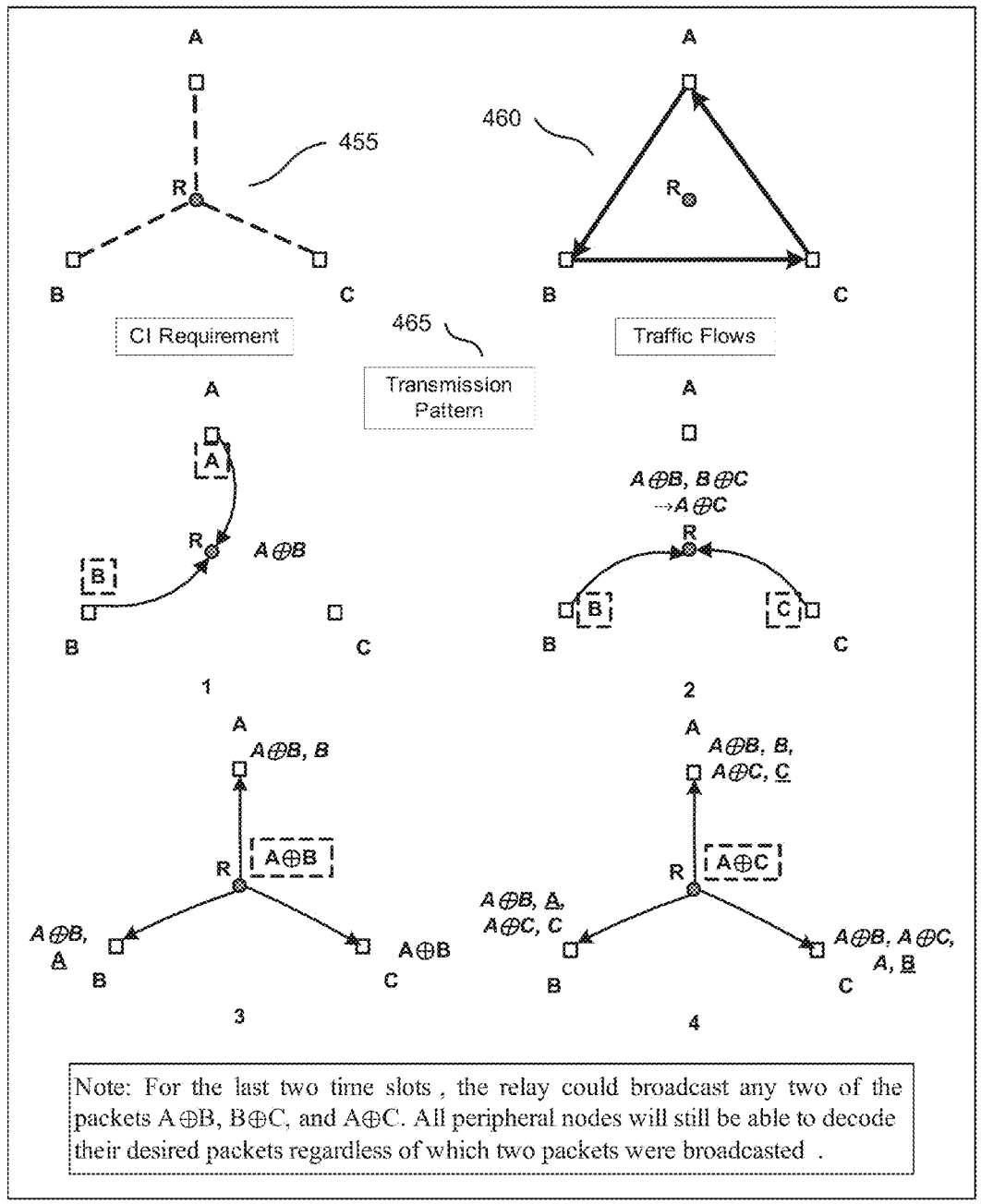
FIG. 4B is an illustration of a PNC atom in a triangle configuration.
Figure 5:
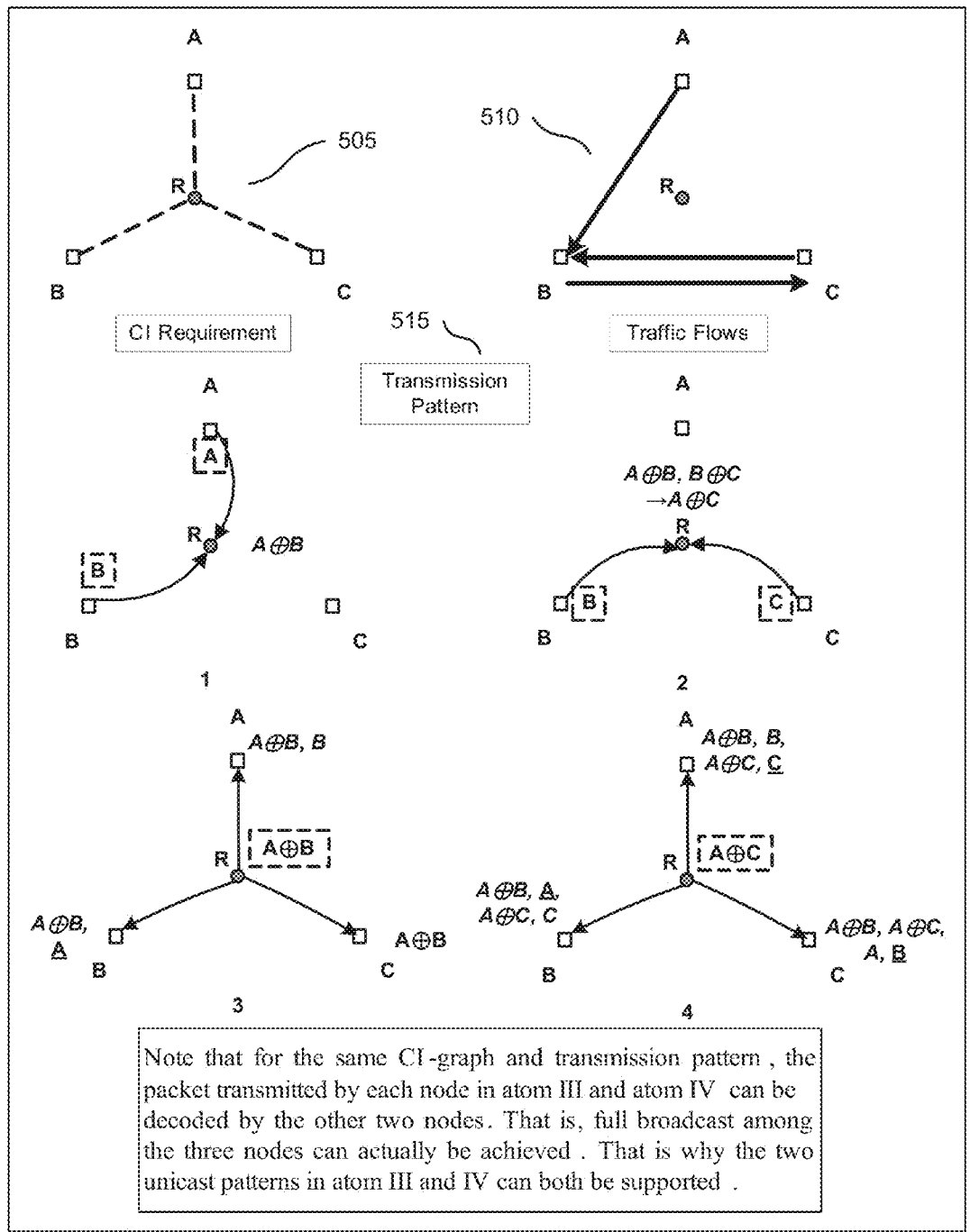
FIG. 5 is an illustration of a PNC atom in a wedge configuration.

Referring to FIG. 4B and FIG. 5, these two graphical illustrations 450 and 500, respectively, show the traffic flows graphs for PNC atom III and PNC atom IV, a triangle and a wedge, respectively. To explain these two atoms for starters, refer to FIG. 4A, which is a broadcast model of a triangular network. The CI-graphs (455 and 505) and transmission patterns (465 and 515) of PNC atom III and PNC atom IV are the same and are specified in FIG. 4A. Only the traffic flows graphs between the wedge atom and the triangle atom differ. The same transmission pattern 415 as specified in FIG. 4A can satisfy the traffic flow requirements of both atom III and atom IV, as explained below.

For both PNC atom III and PNC atom IV, there are three nodes, i.e. {A, B, C}, and one relay R. The nodes may be arranged in a triangular fashion around the relay, but at the least, the CI requirement 405 for them specifies that all the three nodes A, B, and C are in transmission range of relay R.

The traffic flows graph 410 of FIG. 4A specifies broadcast traffic flows rather than unicast traffic flows. The dotted lines are used to indicate multicasting. For example, the dotted line from node A to node B and the dotted line from node A to node C indicate that the same message A from node A (rather than two distinct messages) is to be delivered to nodes B and C. If the broadcast traffic flows requirement in FIG. 4A can be satisfied, then so can the unicast traffic flows requirements in PNC atom III (FIG. 4B) and PNC atom IV (FIG. 5). The traffic flows requirement for PNC atom III specifies three flows through relay R: one from node A to node B, one from node B to node C, and one from node C to node A. In other words, there is a data unit from node A to node B, a data unit from node B to node C, and a data unit from node C to node A. The deliveries of these data units are facilitated by relay R. The traffic flows requirement 460 for PNC atom IV also specifies three flows through relay R: one from node A to node B, one from node B to node C, and one from node C to node B. In other words, there is a data unit from node A to node B, a data unit from node B to node C, and a data unit from node C to node B. The deliveries of these data units are facilitated by relay R.

To satisfy the broadcast traffic flows requirements in FIG. 4A, the transmission pattern 415 in FIG. 4A has four distinct operations, each occurring in a successive time slot. In the first operation (time slot) 420, node A and node B transmit their respective packets, packet A and packet B. With the satisfaction of the CI requirement 405 and with the physical-layer network coding mechanism, relay R receives a network-coded message containing a mixture of packets A and B. In FIG. 4A, this network-coded message is shown as the bitwise exclusive-OR (XOR) of packets A and B. However, in general other network coding operations are possible.

In the second operation (time slot) 425, node B and node C transmit their respective packets, packet B and packet C. With the satisfaction of the CI requirement 405 and with the physical-layer network coding mechanism, relay R receives message B XOR C. Then relay R combines the message A XOR B and the message B XOR C, to form the message A XOR C. Alternatively, for the second operation, node A and node C may transmit simultaneously so that relay R receives A XOR C.

In the third operation (time slot) 430, relay R broadcasts the message A XOR B to nodes A, B, and C. Upon receiving this message, node B uses its self-information (i.e., packet B), with this message (i.e., A XOR B), to extract message A=B XOR (A XOR B). In a similar fashion, node A can extract message B. Meanwhile, node C stores message A XOR B for future use.

In the fourth operation (time slot) 435, relay R broadcasts the message A XOR C to nodes A, B, and C. Upon receiving this message, node A uses its self-information (i.e., packet A), with this message (i.e., A XOR C), to extract message C=A XOR (A XOR C). In a similar fashion, node B can extract message C (using its previous extracted message A in the third operation), and node C can extract message A. Furthermore, node C uses message A, with the previous network-coded message it received in the third operation (i.e., A XOR B), to extract message B=A XOR (A XOR B).

Finally, the packet transmitted by each node can be decoded by the other two nodes, i.e., node A can extract both message B and message C, node B can extract both message A and message C, and node C can extract both message A and message B.

Since for both PNC atom III and PNC atom IV, the unicast traffic flows are a subset of the broadcast traffic flows in FIG. 4A, the same transmission pattern 415 in FIG. 4A can satisfy the unicast traffic flows.

Thus, both PNC atom III, the cross, and PNC atom IV, the wedge, can complete their own transmission of the aforementioned traffic flows in 4 time slots. In contrast, the traditional store-and-forward scheme would complete the same transmissions in 6 time slots.

Description of PNC Atom V: Cross

Figure 6:
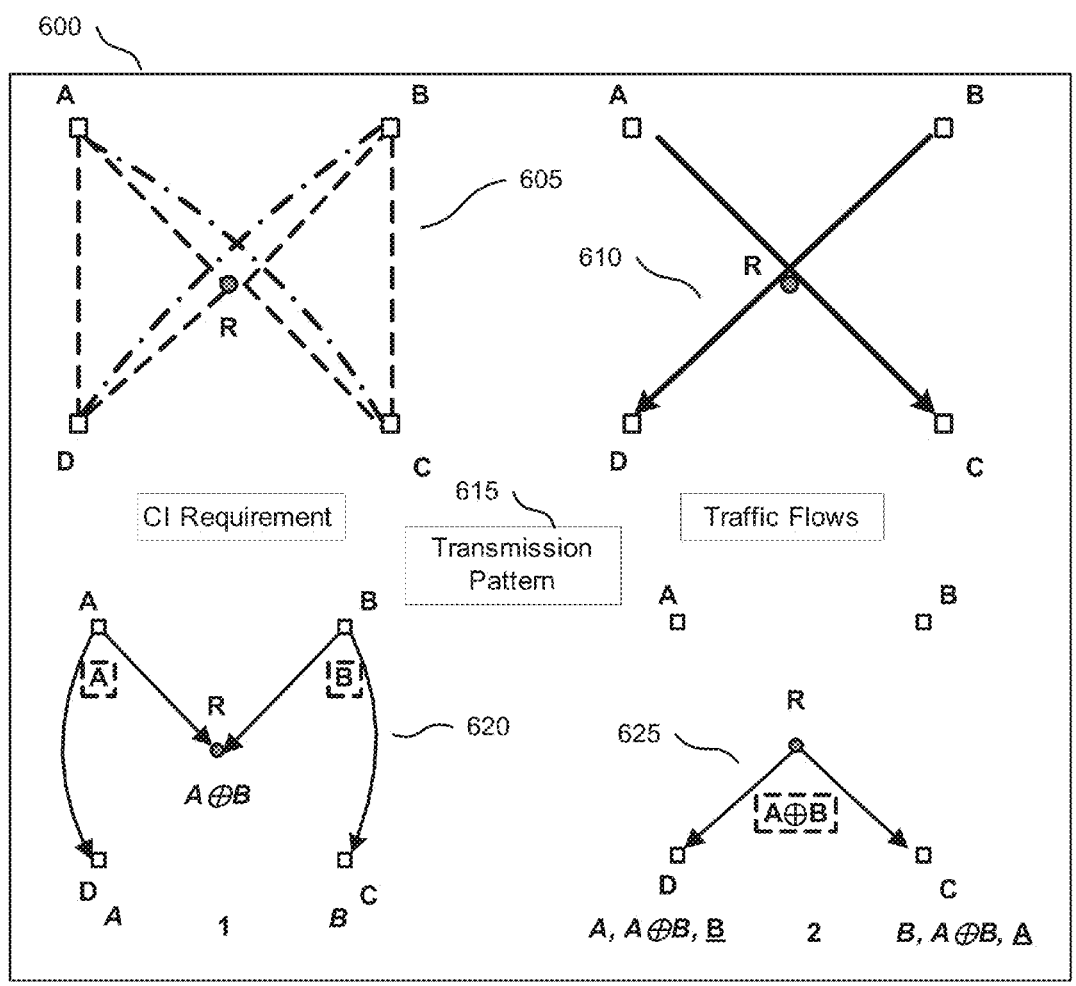
FIG. 6 is an illustration of a PNC atom in a cross configuration.

Referring to FIG. 6, the graphical illustration 600 shows PNC atom V, a cross. Here, there are four nodes, i.e. {A, B, C, D}, and one relay R. The nodes may be arranged in a box-like fashion around the relay, but at the least, the CI requirement 605 for PNC atom V specifies: for connectivity requirement, a first node A is in transmission range of fourth node D and relay R, a second node B is in transmission range of third node C and relay R, node C is in transmission range of node B and relay R, and node D is in transmission range of node A and relay R; for interference-free requirement, node A is out of interference range of node C, and node B is out of interference range of node D.

The traffic flows requirement 610 for atom V specifies two flows through relay R: one from node A to node C, and one from node B to node D. In other words, there is a data unit from node A to node C, and a data unit from node B to node D. The deliveries of these data units are facilitated by relay R, as specified by the transmission pattern 615 of PNC atom V.

The transmission pattern 615 for PNC atom V may have two distinct operations, each occurring in a successive time slot. In the first operation (time slot) 620, node A and node B transmit their respective packets, packet A and packet B. With the satisfaction of the CI requirement 605 and with the physical-layer network coding mechanism, relay R receives a network-coded message containing a mixture of packets A and B. In FIG. 6, this network-coded message is shown as the bitwise exclusive-OR (XOR) of packets A and B. However, in general other network coding operations are possible. Meanwhile, node D and node C receive message A and message B respectively.

In the second operation (time slot) 625, relay R broadcasts the message A XOR B to nodes C and D. Upon receiving this message, node D uses its previous received message A in the first operation, with this message (i.e., A XOR B), to extract message B=A XOR (A XOR B). This is the packet to be delivered from node B to node D according to the traffic flows requirement 610 for PNC atom V. In a similar fashion, node C can extract message A. This is the packet to be delivered from node A to node C according to the traffic flows requirement 615 for PNC atom V.

Thus, PNC atom V, the cross, can complete transmission of the aforementioned traffic flows in 2 time slots. In contrast, the traditional store-and-forward scheme would complete the same transmissions in 4 time slots.

Description of PNC Atom VI: Asymmetric Star

Figure 7:
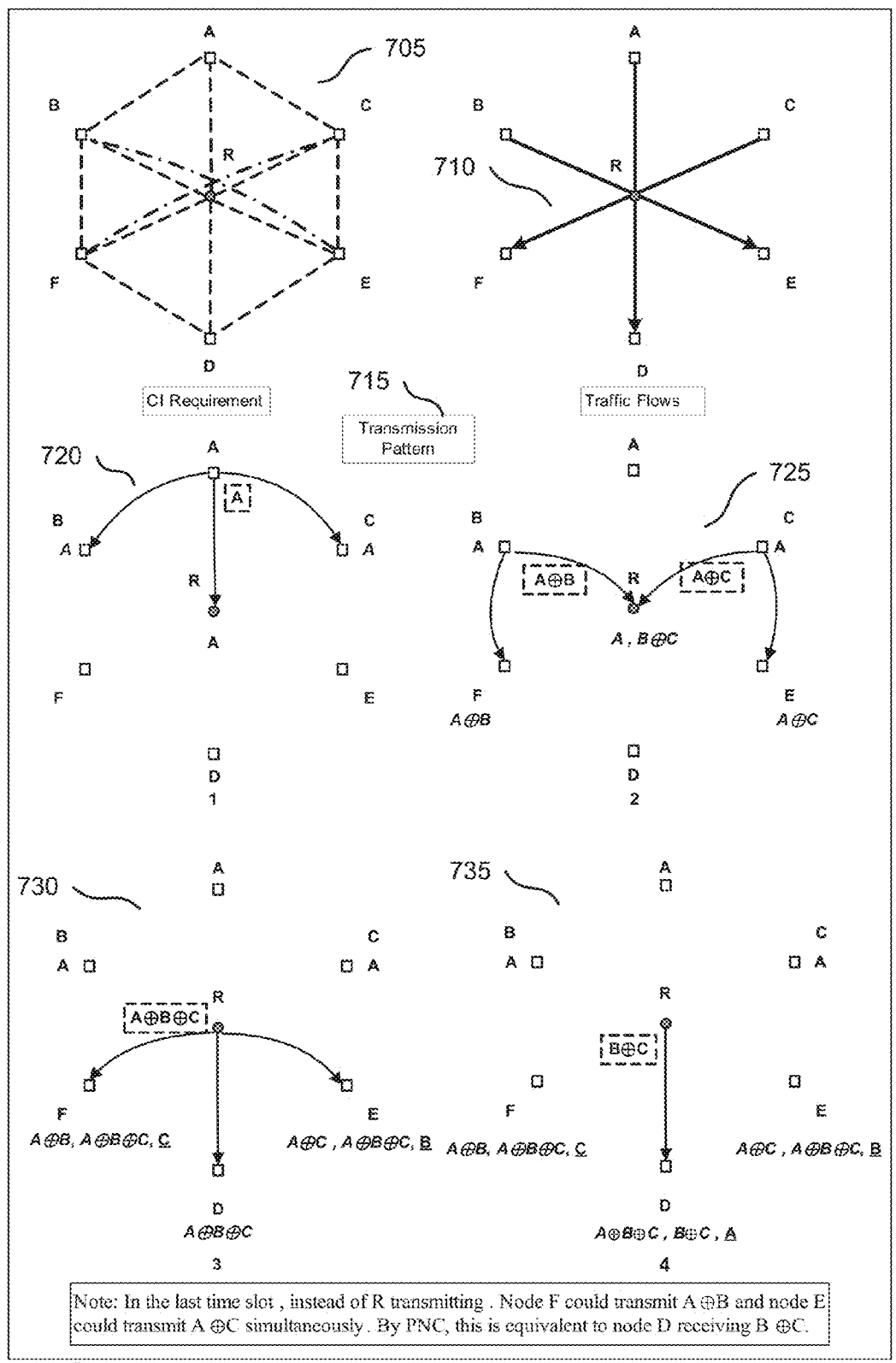
FIG. 7 is an illustration of a PNC atom in an asymmetric star configuration.

Referring to FIG. 7, the graphical illustration 700 shows PNC atom VI, an asymmetric star. Here, there are six nodes, i.e. {A, B, C, D, E, F}, and one relay R. The nodes may be arranged in a star fashion around the relay, but at the least, the CI requirement 705 for PNC atom VI specifies: for connectivity requirement, a first node A is in transmission range of second node B; third node C and relay R, node B is in transmission range of node A, sixth node F and relay R; node C is in transmission range of node A, fifth node E and relay R; fourth node D is in transmission range of node E, node F and relay R; node E is in transmission range of node C, node D and relay R; and node F is in transmission range of relay R, as well as node B and node D; for interference-free requirement, node B is out of interference range of node E, and node C is out of interference range of node F.

The traffic flows requirement 710 for PNC atom VI specifies three flows through relay R: one from node A to node D, one from node B to node E, and one from node C to node F. In other words, there is a data unit from node A to node D, a data unit from node B to node E, and a data unit from node C to node F. The deliveries of these data units are facilitated by relay R, as specified by the transmission pattern 715 of PNC atom VI.

The transmission pattern 715 for PNC atom VI may have four distinct operations, each occurring in a successive time slot. In the first operation (time slot) 720, node A multicasts its packet A to node B, node C and relay R.

In the second operation (time slot) 725, node B combines its self-packet B and the previous received message A to form a network-coded message. In FIG. 7, this network-coded message is shown as the bitwise exclusive-OR (XOR) of messages A and B. However, in general other network coding operations are possible. Similarly, node C can form message A XOR C. Then node B and node C transmit their respective messages, A XOR B and A XOR C. With the satisfaction of the CI requirement 705 and with the physical-layer network coding mechanism, relay R receives a network-coded message B XOR C=(A XOR B) XOR (A XOR C). Meanwhile, node F and node E receive message A XOR B and message A XOR C, respectively.

In the third operation (time slot) 730, relay R combines message B XOR C and the packet A, to form the message A XOR B XOR C. The packet containing this message is then multicasted to nodes E, F, and D. Upon receiving this message, node F uses its previous received message A XOR B, together with this message (i.e., A XOR B XOR C), to extract message C=(A XOR B) XOR (A XOR B XOR C). This is the packet to be delivered from node C to node F according to the traffic flows requirement 710 for atom VI. In a similar fashion, node E can extract message B. Meanwhile, node D stores message A XOR B XOR C for future use.

In the fourth operation (time slot) 735, relay R transmits the message B XOR C to node D. Upon receiving this message, node D uses its previous received message A XOR B XOR C in the third operation, with this message (i.e., B XOR C), to extract message A=(B XOR C) XOR (A XOR B XOR C). This is the packet to be delivered from node A to node D according to the traffic flows requirement 710 for PNC atom VI.

Thus, PNC atom VI, the asymmetric star, can complete transmission of the aforementioned traffic flows in 4 time slots. In contrast, the traditional store-and-forward scheme would complete the same transmissions in 6 time slots.

Description of PNC Atom VII: Symmetric Star

Figure 8:
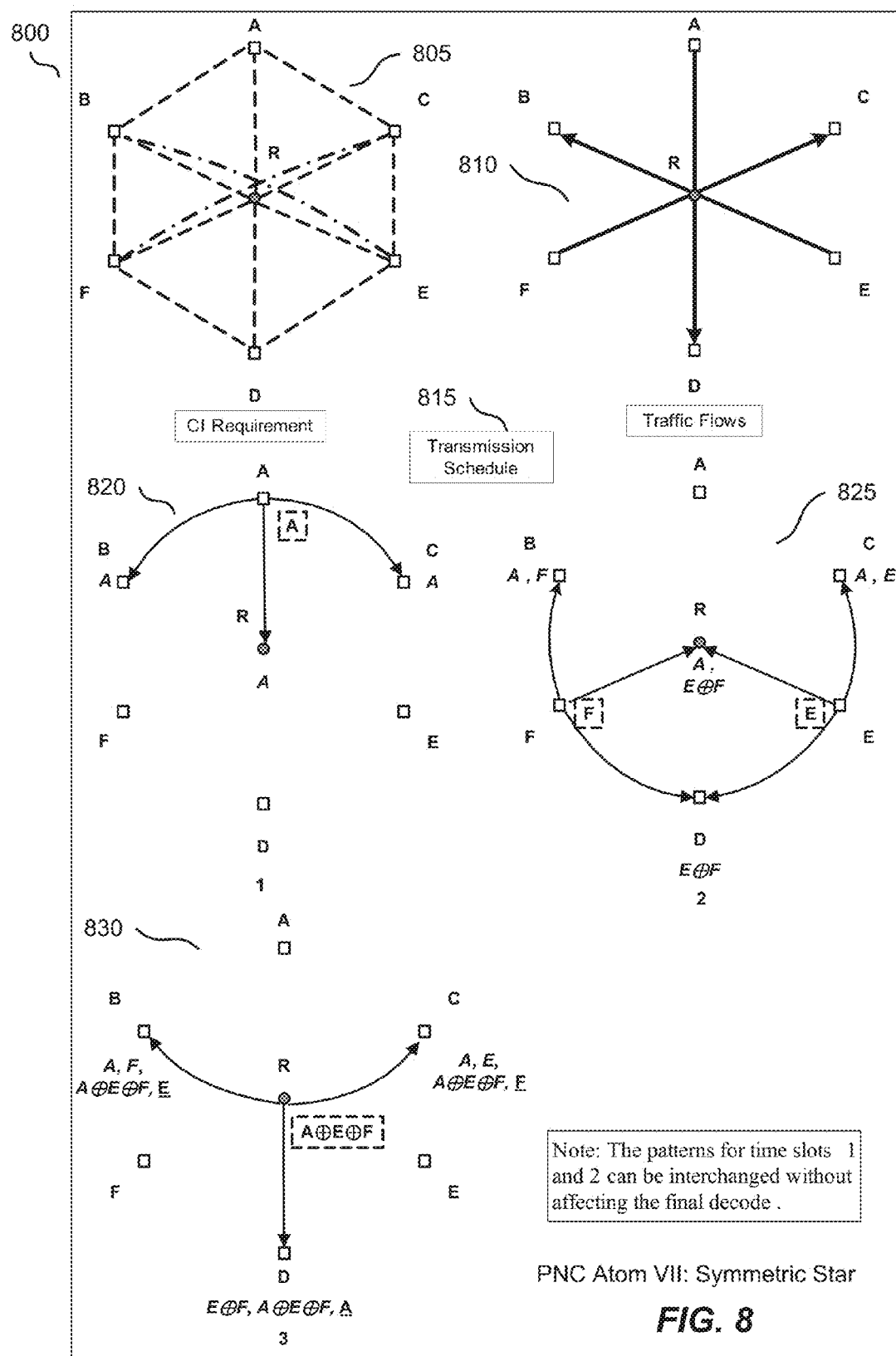
FIG. 8 is an illustration of a PNC atom in a symmetric star configuration.

Referring to FIG. 8, the graphical illustration 800 shows PNC atom VII, a symmetric star. Here, there are six nodes, i.e. {A, B, C, D, E, F}, and one relay R. The nodes may be arranged in a star fashion around the relay, but at the least, PNC atom VII has the same CI requirement 805 as PNC atom VI (see CI requirement 705).

The traffic flows requirement 810 for PNC atom VII specifies three flows through relay R: one from node A to node D, one from node E to node B, and one from node F to node C. In other words, there is a data unit from node A to node D, a data unit from node E to node B, and a data unit from node F to node C. The deliveries of these data units are facilitated by relay R, as specified by the transmission pattern 815 of PNC atom VII.

The transmission pattern for PNC atom VII may have three distinct operations, each occurring in a successive time slot. In the first operation (time slot) 820, node A multicasts its packet A to node B, node C and relay R.

In the second operation (time slot) 825, node E and node F transmit their respective packets, packet E and packet F. With the satisfaction of the CI requirement 805 and with the physical-layer network coding mechanism, both relay R and node D receive a network-coded message containing a mixture of packets E and F. In FIG. 8, this network-coded message is shown as the bitwise exclusive-OR (XOR) of packets E and F. However, in general other network coding operations are possible. Meanwhile, node C and node B receive message E and message F respectively.

In the third operation (time slot) 830, relay R combines message E XOR F and the packet A, to form the message A XOR E XOR F. The packet containing this message is then multicasted to nodes B, C, and D. Upon receiving this message, node B uses its previously received packets in the first and second operations (i.e., packet A and packet F), together with this message (i.e., A XOR E XOR F), to extract message E=A XOR F XOR (A XOR E XOR F). This is the packet to be delivered from node E to node B according to the traffic flows requirement for atom VII. In a similar fashion, node C can extract message F. Meanwhile, node D uses its previous received network-coded packet E XOR F, together with this message (i.e., A XOR E XOR F), to extract message A=(E XOR F) XOR (A XOR E XOR F). This is the packet to be delivered from node A to node D according to the traffic flows requirement 810 for PNC atom VII.

Thus, PNC atom VII, the symmetric star, can complete transmission of the aforementioned traffic flows 810 in 3 time slots. In contrast, the traditional store-and-forward scheme would complete the same transmissions in 6 time slots.

Description of PNC Atom VIII: Bidirectional Star

Figure 9:
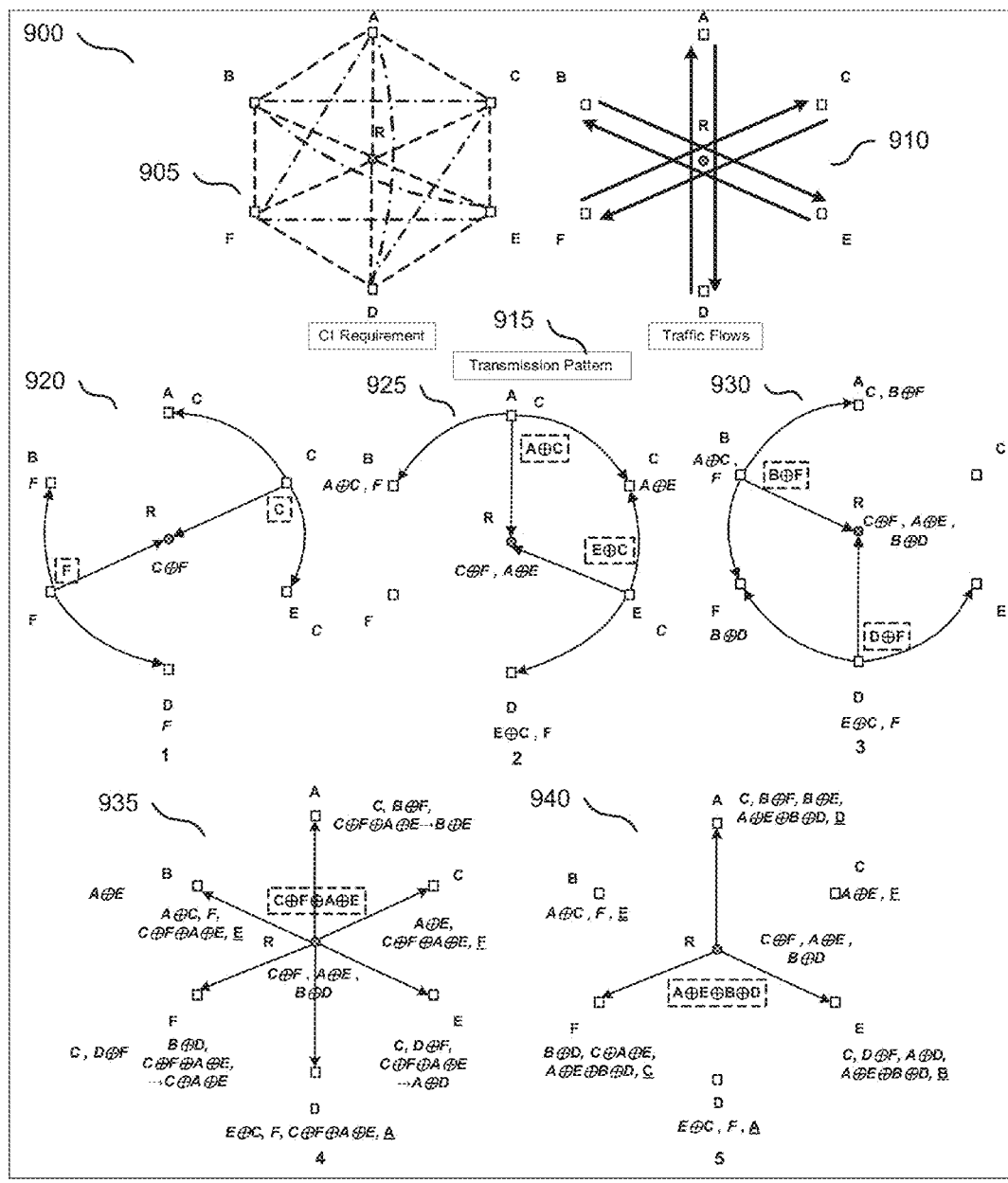
FIG. 9 is an illustration of a PNC atom in a bidirectional star configuration.

Referring to FIG. 9, the graphical illustration 900 shows PNC atom VIII, a bidirectional star. Here, there are six nodes, i.e. {A, B, C, D, E, F}, and one relay R. The nodes may be arranged in a star fashion around the relay, but at the least, the CI requirement 905 for PNC atom VIII specifies: for connectivity requirement, a first node A is in transmission range of second node B, third node C and relay R; node B is in transmission range of node A, sixth node F and relay R; node C is in transmission range of node A, fifth node E and relay R; fourth node D is in transmission range of node E, node F and relay R; and node E is in transmission range of node C, node D and relay R; for interference-free requirement, node A is out of interference range of node F and node D, node C is out of interference range of node B and node D, and node E is out of interference range of node B and node F.

The traffic flows requirement 910 for PNC atom VIII specifies three bi-directional flows through relay R: one to and from nodes A and D, one to and from nodes B and E, and one to and from nodes C and F. In other words, there is a data unit from node A to node D, and a data unit from node D to node A; a data unit from node B to node E, and a data unit from node E to node B; and a data unit from node C to node F, and a data unit from node F to node C. The deliveries of these data units are facilitated by relay R, as specified by the transmission pattern 915 of PNC atom VIII.

The transmission pattern 915 for PNC atom VIII may have five distinct operations, each occurring in a successive time slot. In the first operation (time slot) 920, node C and node F transmit their respective packets, packet C and packet F. With the satisfaction of the CI requirement 905 and with the physical-layer network coding mechanism, relay R receives a network-coded message containing a mixture of packets C and F. In FIG. 9, this network-coded message is shown as the bitwise exclusive-OR (XOR) of packets C and F. However, in general other network coding operations are possible. Meanwhile, both node A and node E receive packet C, and both node B and node D receive packet F.

In the second operation (time slot) 925, node A combines its self-packet A and the previous received message C to form a network-coded message A XOR C. Similarly, node E can form message E XOR C. Then node A and node E transmit their respective messages, A XOR C and E XOR C. With the satisfaction of the CI requirement 905 and with the physical-layer network coding mechanism, relay R receives a network-coded message A XOR E=(A XOR C) XOR (E XOR C). Meanwhile, node B and node D receive message A XOR C and message E XOR C respectively.

In the third operation (time slot) 930, node B combines its self-packet B and the message F which is received in the first operation to form a network-coded message B XOR F. Similarly, node D can form message D XOR F. Then node B and node D transmit their respective messages, B XOR F and D XOR F. With the satisfaction of the CI requirement and with the physical-layer network coding mechanism, relay R receives a network-coded message B XOR D=(B XOR F) XOR (D XOR F). Meanwhile, node A and node E receive message B XOR F and message D XOR F respectively.

In the fourth operation (time slot) 935, relay R combines message C XOR F and the message A XOR E, to form the message C XOR F XOR A XOR E. The packet containing this message is then broadcasted to nodes A, B, C, D, E, and F. Upon receiving this message: node B uses its previously received packets in the first and second operations (i.e. packet F and packet A XOR C), together with this message (i.e., C XOR F XOR A XOR E), to extract message E=(A XOR C) XOR F XOR (C XOR F XOR A XOR E). This is the packet to be delivered from node E to node B according to the traffic flows requirement 910 for PNC atom VIII; in a similar fashion, node D can extract message A; node C uses its self-information (i.e., packet C), the network-coded message it received in the second operation (i.e., A XOR E), together with this message (i.e., C XOR F XOR A XOR E), to extract message F=(A XOR E) XOR C XOR (C XOR F XOR A XOR E). This is the packet to be delivered from node F to node C according to the traffic flows requirement for atom VIII; node A uses its self-information (i.e., packet A), the messages C and B XOR F it previously received in the first and second operations respectively, together with this message (i.e., C XOR F XOR A XOR E), to extract message B XOR E=A XOR C XOR (B XOR F) XOR (C XOR F XOR A XOR E) for future use; in a similar fashion, node E can extract message A XOR D; node F uses its self-information (i.e., packet F), together with this message (i.e., C XOR F XOR A XOR E), to extract message C XOR A XOR E=F XOR (C XOR F XOR A XOR E) for future use.

In the fifth operation (time slot) 940, relay R combines message A XOR E and the message B XOR D, to form the message A XOR E XOR B XOR D. The packet containing this message is then multicasted to nodes A, E, and F. Upon receiving this message, node A uses its self-information (i.e., packet A), the network-coded message it extracted in the fourth operation (i.e., message B XOR E), together with this message (i.e., A XOR E XOR B XOR D), to extract message D=A XOR (B XOR E) XOR (A XOR E XOR B XOR D). This is the packet to be delivered from node D to node A according to the traffic flows requirement 910 for PNC atom VIII. In a similar fashion, node E can extract message B. Meanwhile, node F uses its previous extracted message C XOR A XOR E in the fourth operation, the message B XOR D which is received in the third operation, together with this message (i.e., A XOR E XOR B XOR D), to extract message C=C XOR A XOR E XOR (B XOR D) XOR (A XOR E XOR B XOR D). This is the packet to be delivered from node C to node F according to the traffic flows requirement 910 for PNC atom VIII.

Thus, PNC atom VIII, the bidirectional star, can complete transmission of the aforementioned traffic flows in 5 time slots. In contrast, the traditional store-and-forward scheme would complete the same transmissions in 12 time slots.

Description of PNC Atom IX: Special TWRC I

Figure 10:
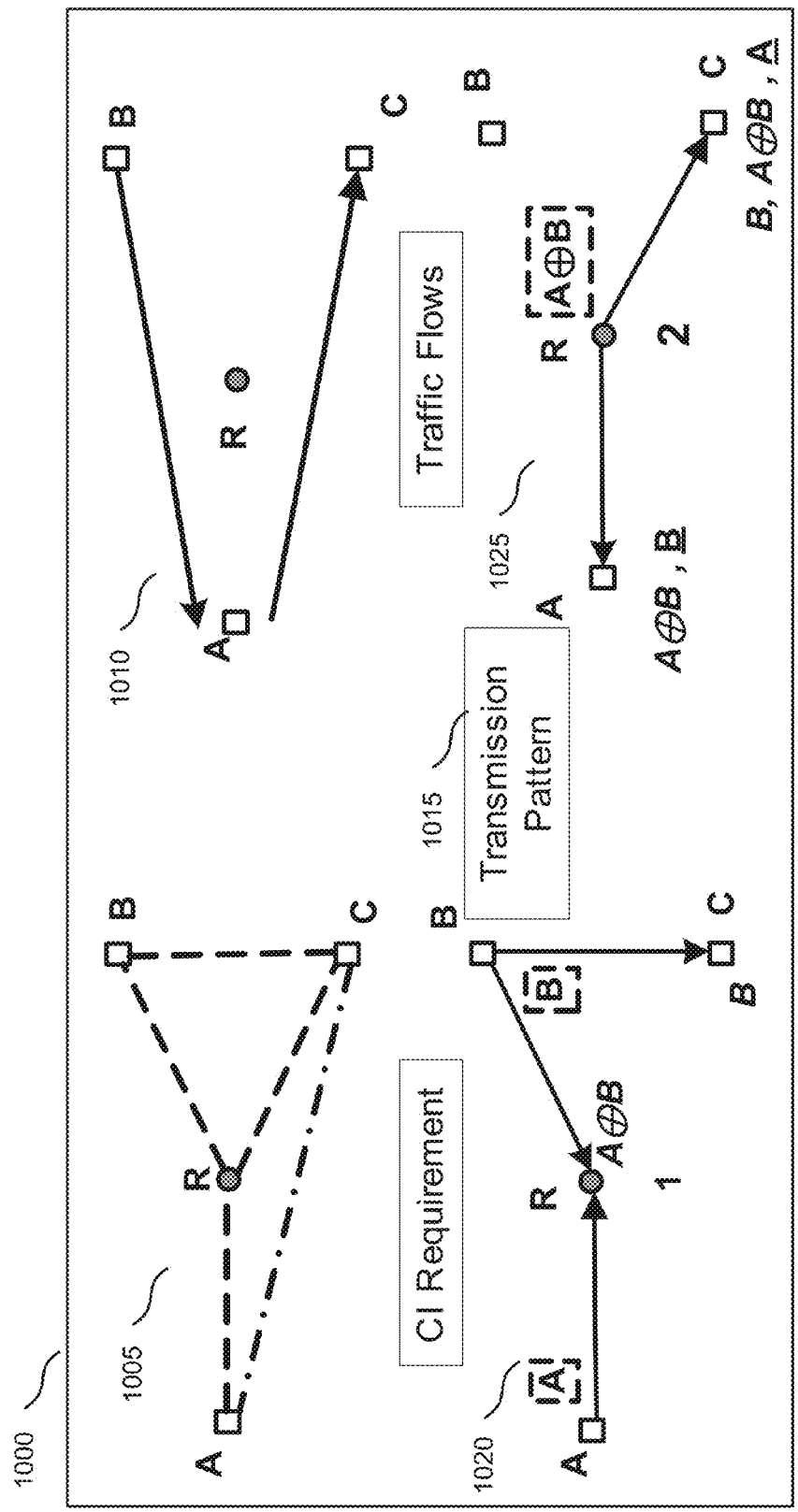
FIG. 10 is an illustration of a PNC atom in a first special TWRC configuration.

Referring to FIG. 10, the graphical illustration 1000 shows PNC atom IX, the special TWRC I. Here, there are three nodes, i.e. {A, B, C}, and one relay R. The nodes may be arranged at the two opposite sides of the relay, but at the least, the CI requirement 1005 for PNC atom IX specifies: for connectivity requirement, a first node A is in transmission range of relay R, and a second node B is in transmission range of third node C and relay R; for interference-free requirement, node C is out of interference range of node A.

The traffic flows requirement 1010 for PNC atom IX specifies two flows through relay R: one from node A to node C, and one from node B to node A. In other words, there is a data unit from node A to node C, and a data unit from node B to node A. The deliveries of these data units are facilitated by relay R, as specified by the transmission pattern 1015 of PNC atom IX.

The transmission pattern 1015 for PNC atom IX may have two distinct operations, each occurring in a successive time slot. In the first operation (time slot) 1020, node A and node B transmit their respective packets, packet A and packet B. With the satisfaction of the CI requirement 1005 and with the physical-layer network coding mechanism, relay R receives a network-coded message containing a mixture of packets A and B. In FIG. 10, this network-coded message is shown as the bitwise exclusive-OR (XOR) of packets A and B. However, in general other network coding operations are possible. Meanwhile, node C receives message B.

In the second operation (time slot) 1025, relay R broadcasts the message A XOR B to nodes A and C. Upon receiving this message, node A uses its self-information (i.e., packet A), with this message (i.e., A XOR B), to extract message B=A XOR (A XOR B). This is the packet to be delivered from node B to node A according to the traffic flows requirement 1010 for PNC atom IX. Meanwhile, node C uses its previous received message B in the first operation, with this message (i.e., A XOR B), to extract message A=B XOR (A XOR B). This is the packet to be delivered from node A to node C according to the traffic flows requirement 1010 for PNC atom IX.

Thus, PNC atom IX, the special TWRC I, can complete transmission of the aforementioned traffic flows in 2 time slots. In contrast, the traditional store-and-forward scheme would complete the same transmissions in 3 time slots.

Description of PNC Atom X: Special TWRC II

Figure 11:
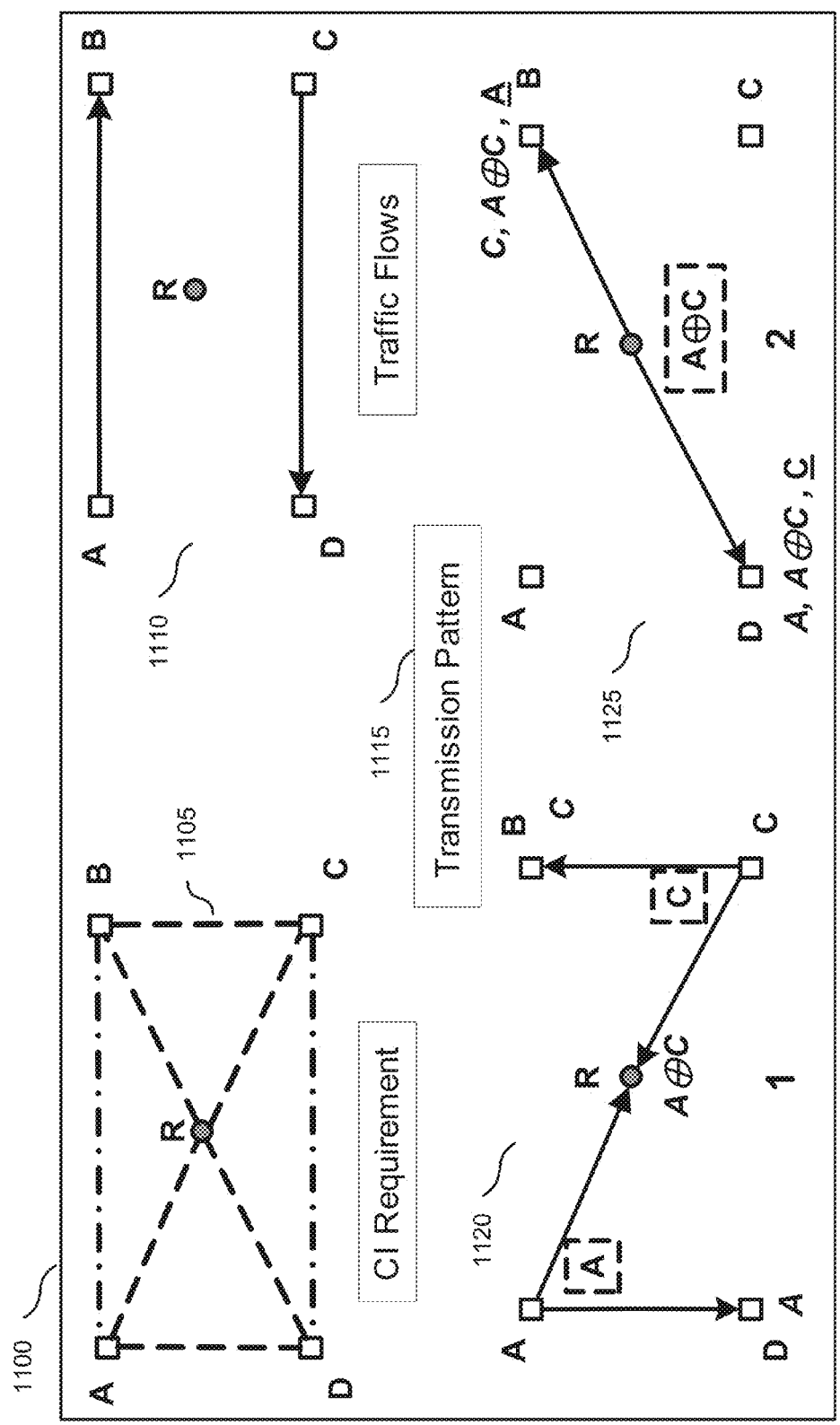
FIG. 11 is an illustration of a PNC atom in a second special TWRC configuration.
Figure 12:
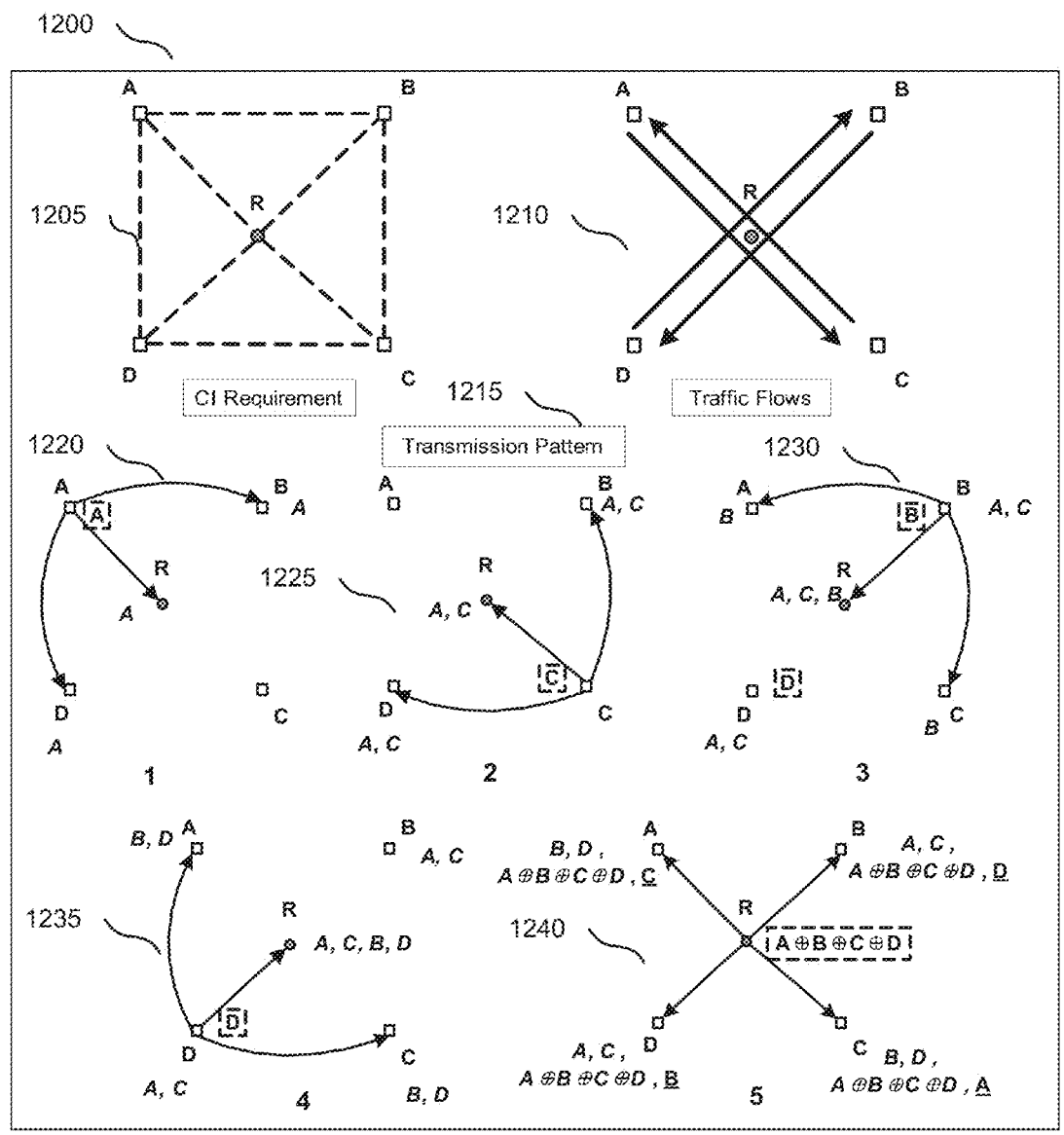
FIG. 12 is an illustration of a straightforward network coding (SNC) atom in a bidirectional cross configuration.
Figure 13:
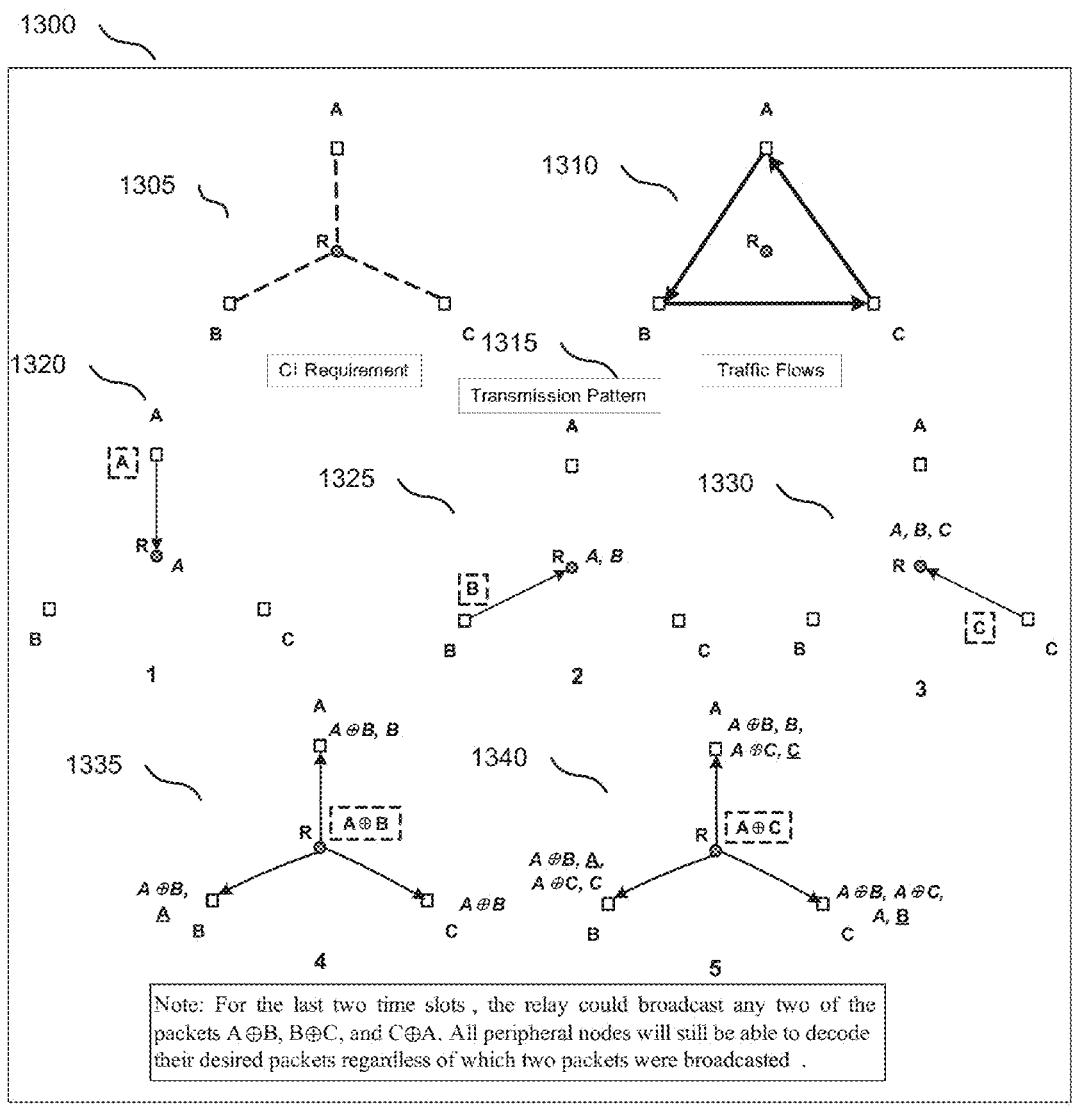
FIG. 13 is an illustration of an SNC atom in a triangle configuration.
Figure 14:
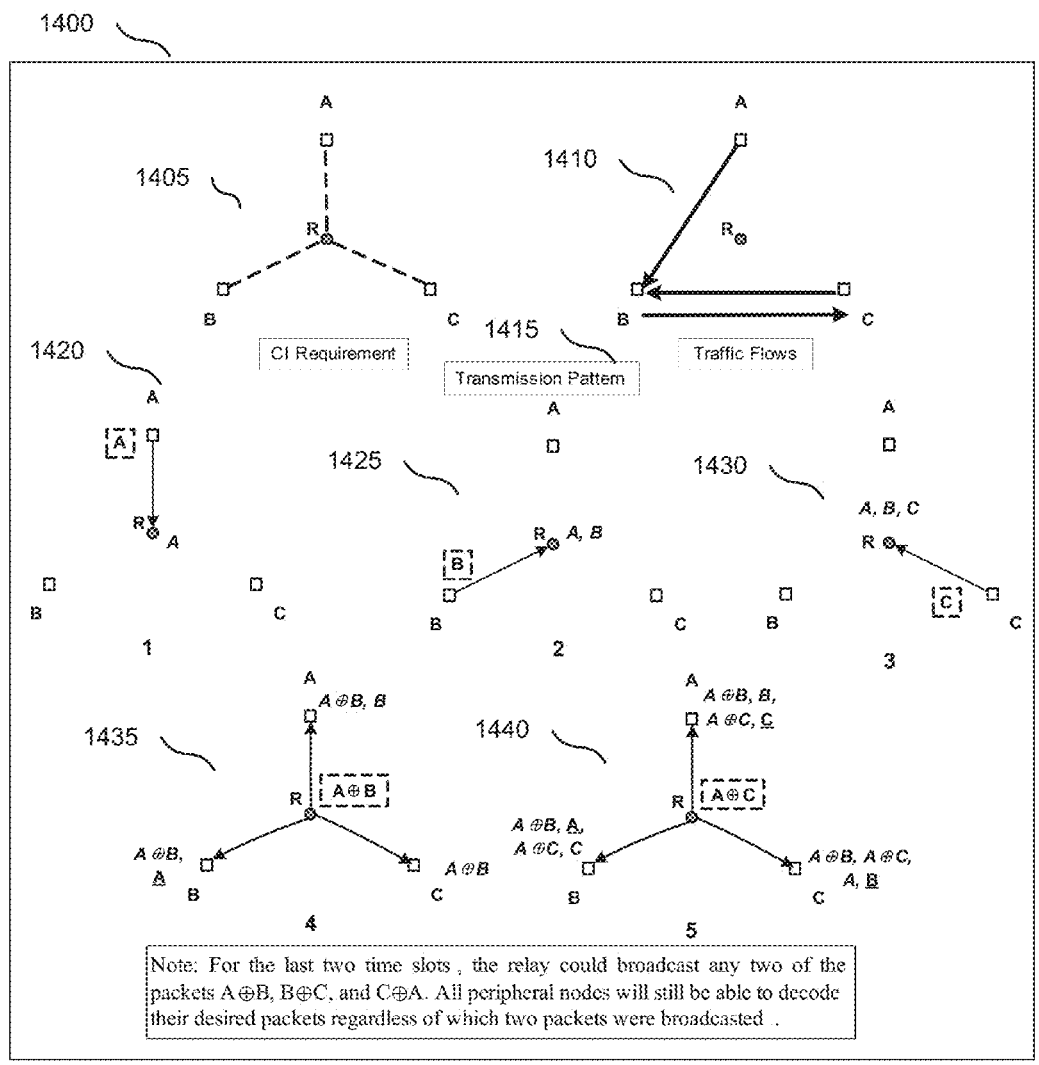
FIG. 14 is an illustration of an SNC atom in a wedge configuration.
Figure 15:
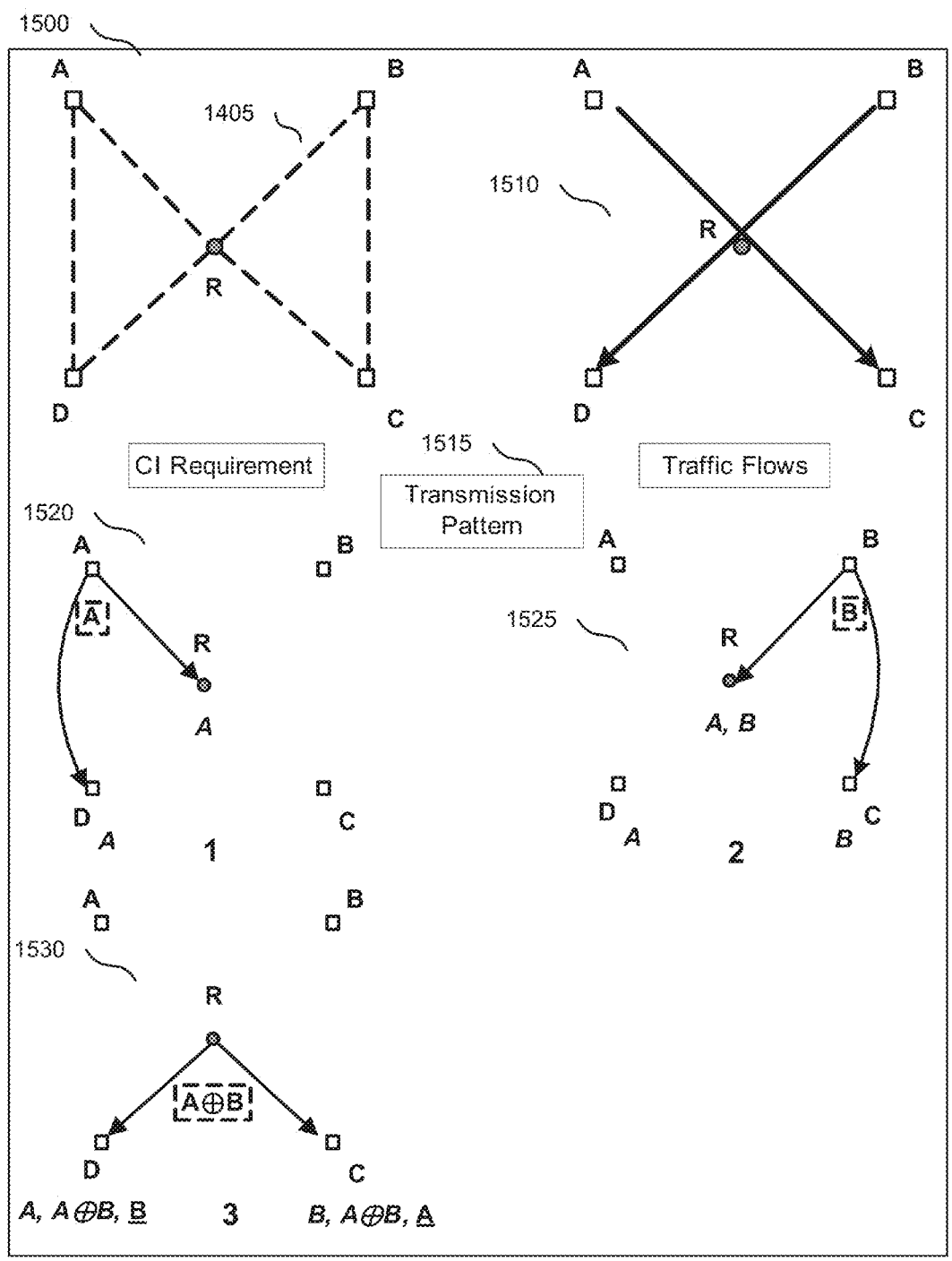
FIG. 15 is an illustration of an SNC atom in a cross configuration.
Figure 16:
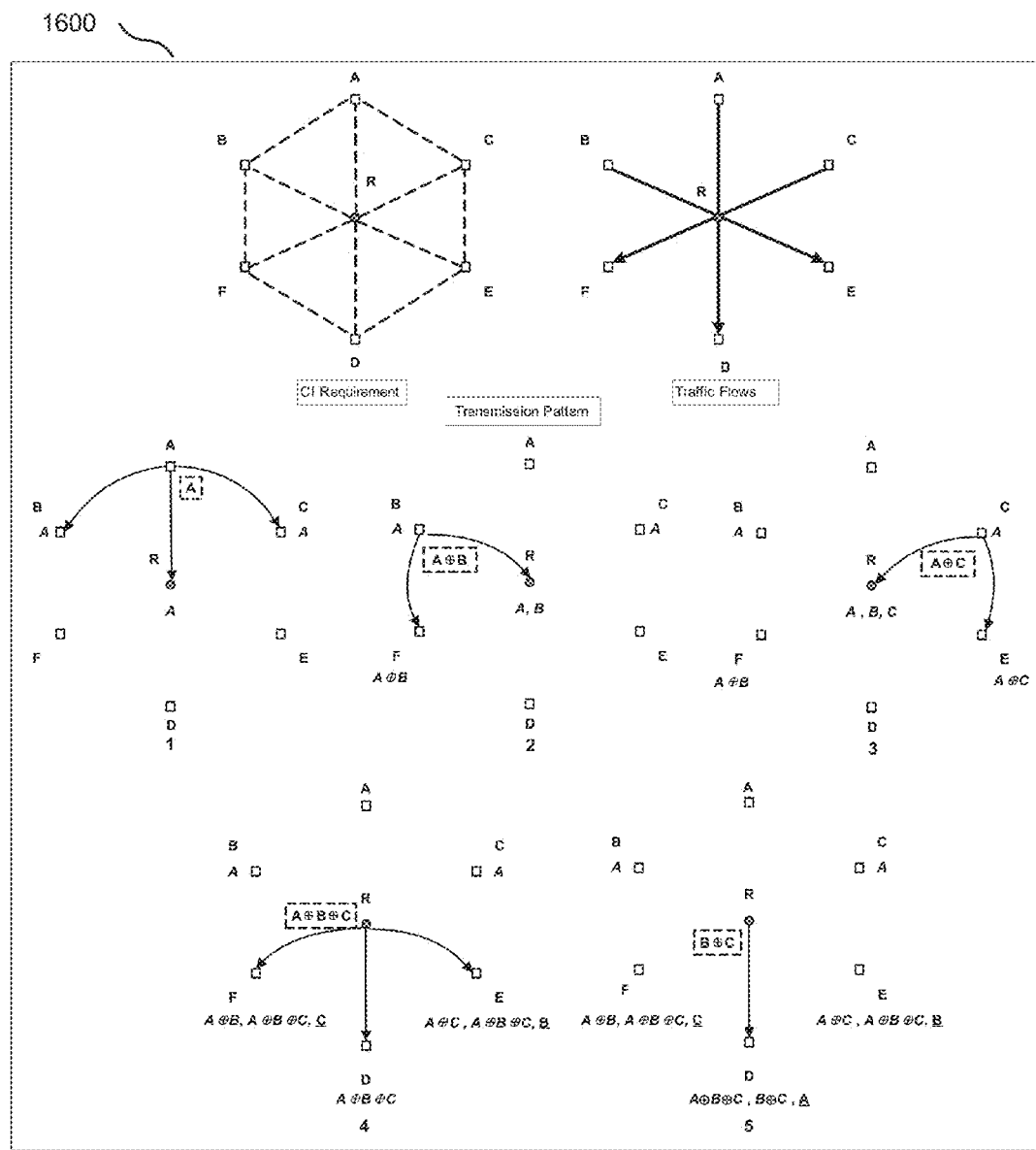
FIG. 16 is an illustration of an SNC atom in an asymmetric star configuration.
Figure 17:
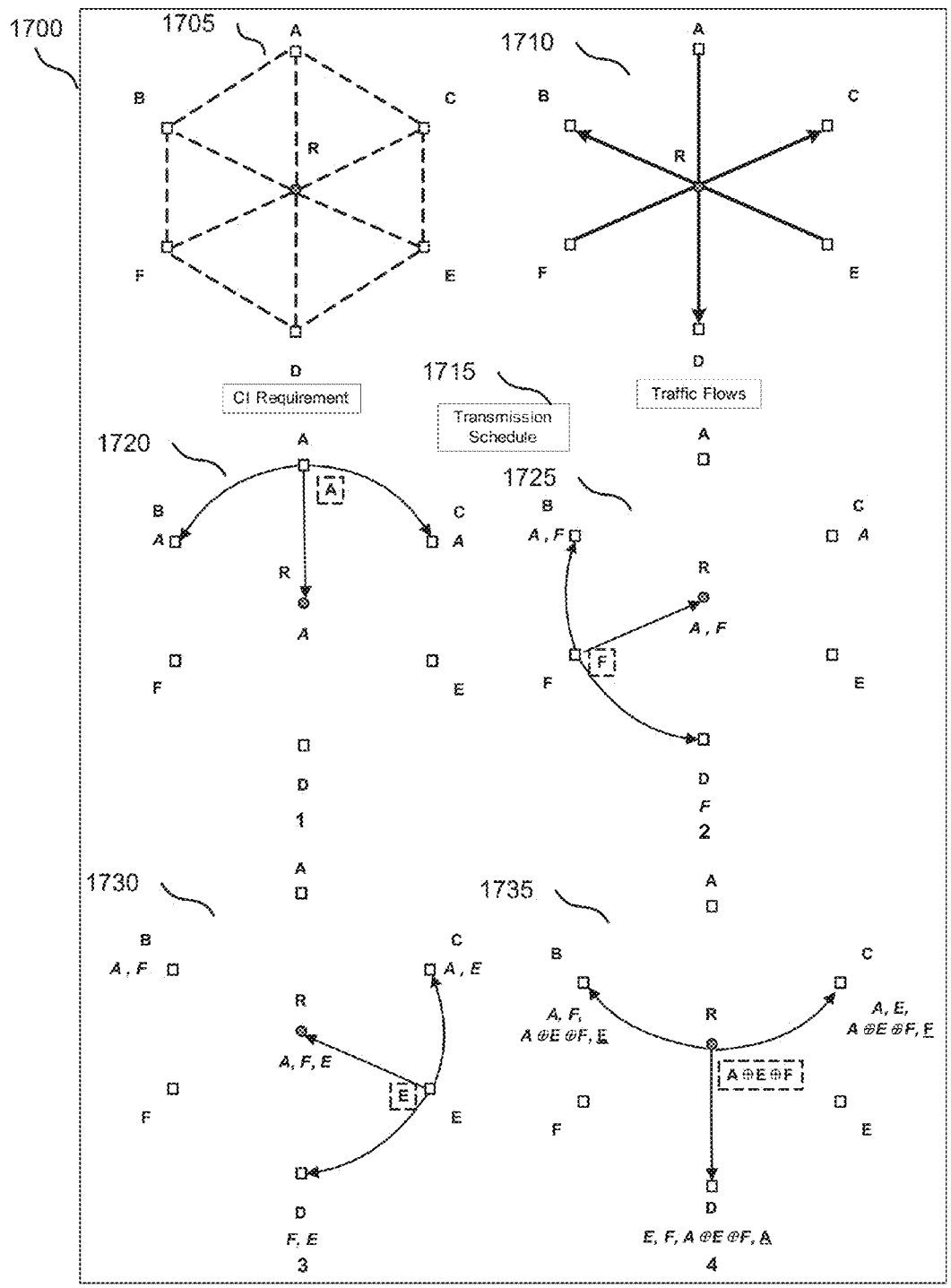
FIG. 17 is an illustration of an SNC atom in a symmetric star configuration.
Figure 18:
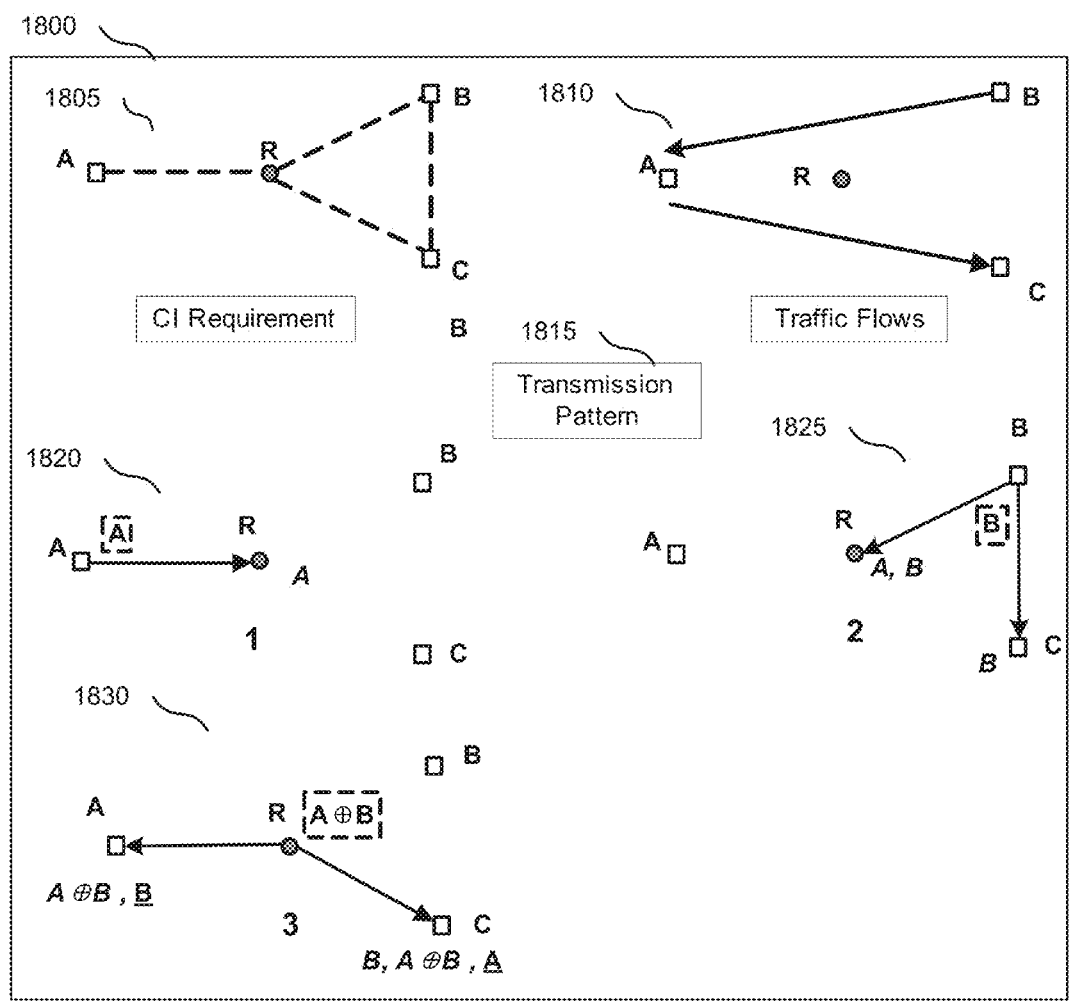
FIG. 18 is an illustration of an SNC atom in a first special TWRC configuration.
Figure 19:
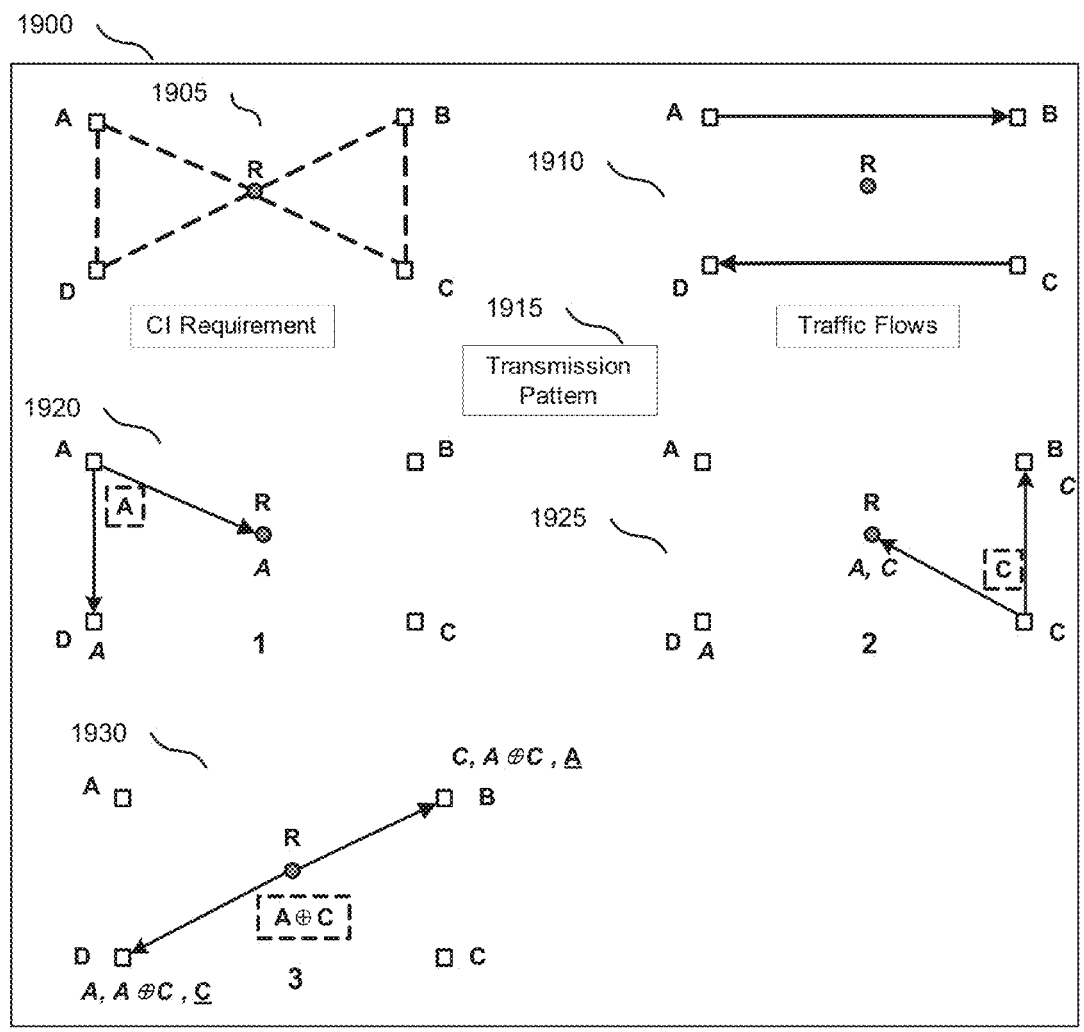
FIG. 19 is an illustration of an SNC atom in a second special TWRC configuration.

Referring to FIG. 11, the graphical illustration 1100 shows PNC atom X, the special TWRC II. Here, there are four nodes, i.e. {A, B, C, D}, and one relay R. The nodes may be arranged in the two opposite sides of the relay, but at the least, the CI requirement 1105 for atom X specifies: for connectivity requirement, a first node A is in transmission range of fourth node D and relay R, and a second node B is in transmission range of third node C and relay R; for interference-free requirement, node A is out of interference range of node B, and node C is out of interference range of node D.

The traffic flows requirement 1110 for PNC atom X specifies two flows through relay R: one from node A to node B, and one from node C to node D. In other words, there is a data unit from node A to node B, and a data unit from node C to node D. The deliveries of these data units are facilitated by relay R, as specified by the transmission pattern 1115 of PNC atom X.

The transmission pattern 1115 for PNC atom X may have two distinct operations, each occurring in a successive time slot. In the first operation (time slot) 1120, node A and node C transmit their respective packets, packet A and packet C. With the satisfaction of the CI requirement 1100 and with the physical-layer network coding mechanism, relay R receives a network-coded message containing a mixture of packets A and C. In FIG. 11, this network-coded message is shown as the bitwise exclusive-OR (XOR) of packets A and C. However, in general other network coding operations are possible. Meanwhile, node D and node B receive message A and message C, respectively.

In the second operation (time slot) 1125, relay R broadcasts the message A XOR C to nodes B and D. Upon receiving this message, node B uses its previous received message C in the first operation, with this message (i.e., A XOR C), to extract message A=A XOR (A XOR C). This is the packet to be delivered from node A to node B according to the traffic flows requirement 1110 for PNC atom X. In a similar fashion, node D can extract message C.

Thus, PNC atom X, the special TWRC II, can complete transmission of the aforementioned traffic flows in 2 time slots. In contrast, the traditional store-and-forward scheme would complete the same transmissions in 4 time slots.

III. Eight SNC Atoms

Referring to FIGS. 12-19, eight SNC atoms are presented herein, with CI requirements and traffic flows that are identical to their PNC counterparts (see FIGS. 2-11), but with slightly different transmission patterns due to the properties about SNC compared to PNC. Specifically, simultaneous transmissions by multiple transmitters to the same receiver are not allowed, while PNC allows for this. For example, suppose the goal of the replay is to get A XOR B. In SNC, node A has to send packet A to the relay in one time slot, and then node B has to send packet B to the relay in another time slot. Then, the relay may compute A XOR B. In PNC, nodes A and B may send their packets simultaneously to the relay. The relay makes use of signal processing techniques to extract A XOR B out of the simultaneous signals. It may be evident then that optimal PNC atoms should never use more time slots than their SNC counterparts. The SNC atoms have the only extra constraint compared to PNC by definition, and hence the building blocks for straightforward network coding (SNC) should be treated as counterparts of the PNC building blocks. Relatedly, all the methods described herein related to the SNC atoms can be viewed similarly as methods related to their respective PNC atoms, with the only exception for the constraint on simultaneous transmission and hence the implication on time slots requirements imposed by this constraint. While SNC atoms and PNC atoms are related, SNC atoms may be considered distinct and unique from PNC atoms for at least these reasons herein.

Thus, the descriptions the SNC atoms, as illustrated in FIGS. 12-19, may be identical to their PNC counterparts, except for additional time slots shown in their respective transmission patterns. As the notations used in FIGS. 12-19 are identical to the notations used in FIGS. 2-11, an understanding of the transmission patterns of FIGS. 12-19 will not be enumerated here, as they should be self-evident following the analogous descriptions of the PNC atoms and general descriptions of atoms herein. It should also be noted that an optimal number of time slots for SNC atom VIII may be just double the transmission pattern of SNC atom VII. Since it can be broken down to two atoms, SNC atom VII may not really be considered an atom in the terms as have been defined in the disclosures herein. Thus, SNC atom VIII is not provided herein with a separate diagram or description within FIGS. 12-19.

Figure 20:
FIG. 20 is a chart illustrating various advantages according to some embodiments.

Referring to FIG. 20, chart 2000 shows the numbers of time slots in their transmission patterns for each PNC atom type. Also shown are the numbers of time slots needed for the non-NC the SNC schemes. Descriptions of the PNC and SNC atoms shown here may be found in FIGS. 2-19. From this summary chart 2000, it may be evident that the number of time slots needed to achieve the same transmissions according to the traffic flows for each PNC and SNC atom, but using traditional, non-NC methods, is categorically greater in every case. Thus, the methods described to implement any of the PNC and SNC atoms presented herein may be significantly more efficient than known methods in the art. While it may be clear that PNC atoms use fewer time slots than their SNC counterparts, PNC may not be available, while SNC is. In any case, both SNC and PNC atoms have been shown to be superior to traditional transmission techniques in the art.

IV. Generating a Network Transmission Schedule Using Atoms

Atom Class, Atom Instances, and Decomposition

In the lingo of object-oriented programming, the NC atoms depicted in FIGS. 2-19 may be viewed each as distinct "class" specifications. Each atom instance (or object) fits into the template of an atom class.

Figure 21:
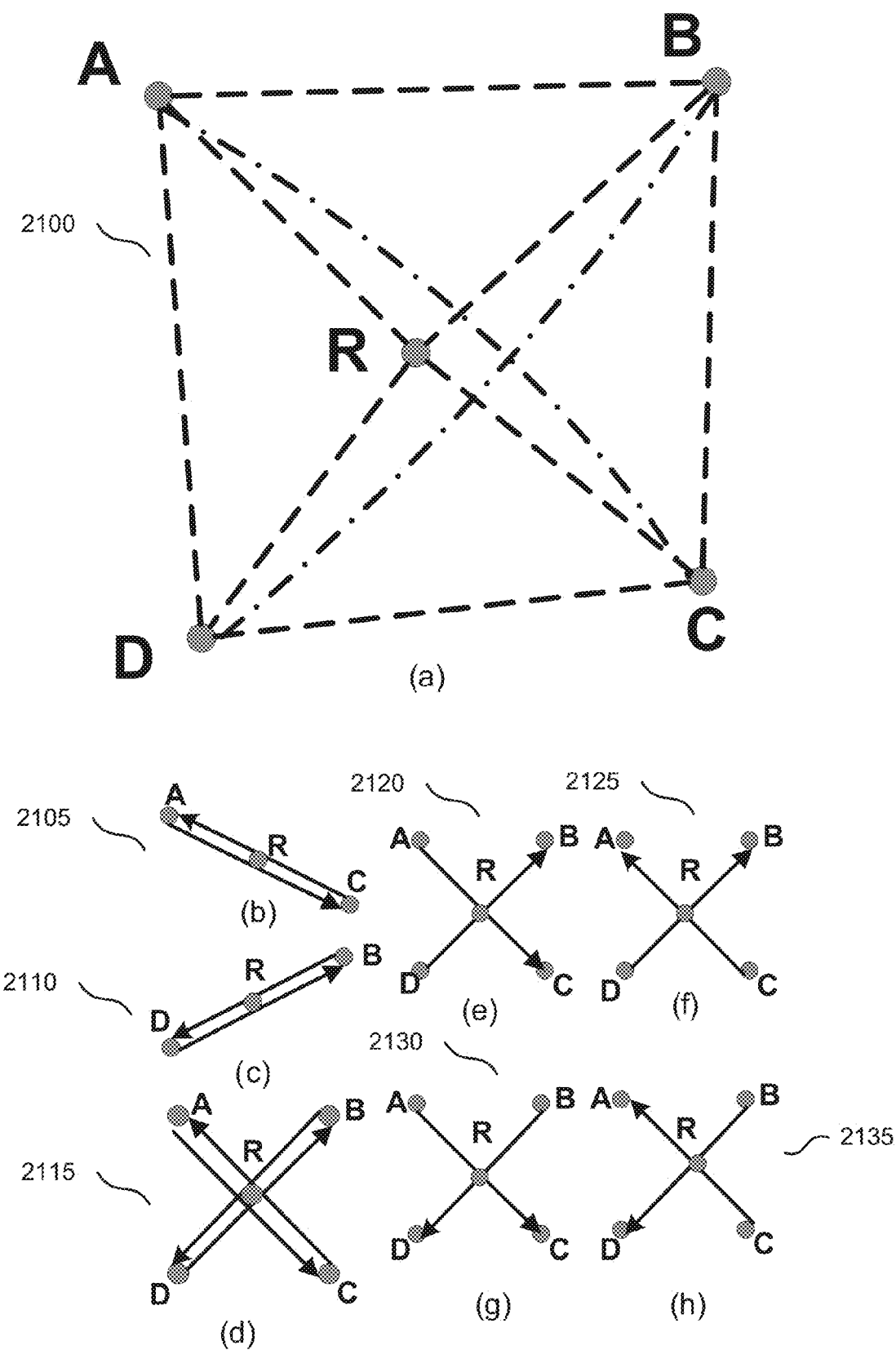
FIG. 21 is an illustration of an example network decomposed into various atom configurations.

Referring to FIG. 21, in a local network, there could be several atom instances belonging to different classes. For example, FIG. 21 shows the structure of a local network 2100 with four peripheral nodes {A, B, C, D} around a relay R. The dashed lines represent the connectivity relationships and the dashed-dotted lines represent the interference-free relationships between nodes. In this example, embedded in this topology are seven atom instances. There are two instances of atom I: their traffic flow diagrams are shown in diagrams 2105 and 2110. There is one instance of atom II: its traffic flow diagram is shown in diagram 2115. There are four instances of atom V: their traffic flow diagrams are shown in diagrams 2120, 2125, 2130, and 2135.

In this example, suppose that the traffic to be delivered across the network topology in FIG. 21 is as follows: 3 traffic units (packets) from A to C; 4 from C to A; 2 from B to D; and 1 from D to B. Accordingly, the numbers of packets to be delivered may be denoted by the vector (3, 4, 2, 1), where the index of said vector corresponds to nodes {A, B, C, D}, respectively. To successfully transmit all the packets, atom instance (d) (2115) could be used once, atom instance (h) (2135) once, and atom instance (b) (2105) twice to deliver the packets: after using atom instance (d) (2115) once, the remaining packets are (2, 3, 1, 0); after using atom instance (h) (2135) once, the remaining packets are (2, 2, 0, 0); after using atom instance (b) (2105) twice, the remaining packets are (0, 0, 0, 0). The total number of time slots used is 3+2+2*2=9. As long as the ratios of the traffic between the nodes are 3:4:2:1, the above schedule may be used repeatedly to deliver the traffic. Scheduling traffic this way using atom instances may be described herein as decomposition. In general, different decompositions are possible to meet the same traffic demands. The more efficient decompositions use fewer time slots. This section will show at least one example of how to formulate the decomposition optimization problem. In some embodiments, the decomposition optimization problem may be formulated as a linear program (LP), which is discussed more below.

The atom classes is discussed more here, to make a point regarding isomorphism between classes. Recall that each of the atoms in FIGS. 2-11 is specified by a configuration including a CI-graph, a traffic flow diagram, and a transmission pattern. There could be configurations that are isomorphic to each other. Two configurations are isomorphic if by permuting the labels of the nodes, one configuration can be transformed to the other (i.e., the CI-graph, traffic flow diagram, and transmission pattern are transformed to those of the other configuration). Isomorphic configurations are not distinct atom classes. The atom classes in FIGS. 2-11 (and FIGS. 12-19) are not isomorphic. In contrast, graphs 2120, 2125, 2130, and 2135 in FIG. 21 are atom instances belonging to the same atom class V: by relabeling nodes, one could fit them into the template of atom class V in FIG. 6.

For each atom class in FIGS. 2-11, the transmission patterns shown are not the only possible pattern. However, the transmission patterns for all the atom classes given in FIGS. 2-11 are optimal in the sense that there are no other patterns consuming fewer time slots. Verification of this assertion may be shown in the proofs given in Section VI. Thus, in some embodiments, the atoms may include a transmission pattern with more time slots than described herein.

Scheduling Using Atom Decomposition

This sub-section formulates the scheduling problem at a local network. It is noted that in some embodiments, in a local network, as far as the traffic routed through the relay R is concerned, there are no traffic demands between two peripheral nodes that are within the transmission range of each other.

In other words, it can be reasoned that if there is traffic from one peripheral node to another peripheral node within its transmission range, it could transmit directly to that peripheral node without going through the relay. Thus, the example scheduling problem described herein focuses on the traffic routed through the relay R.

The scheduling problem may be divided into two steps: (i) identifying the atom instances in the neighborhood of relay R; (ii) generating a schedule, that is preferably optimized, using all of the identified atom instances. In some embodiments, step (ii) is performed by formulating a linear program (LP) using the identified atom instances. In the following two sections, these two steps are detailed.

Identification of Atom Instances

Before detailing steps about identifying the atom instances, a first discussion is needed to identify the traffic flows between nodes that can potentially communicate via R (abbreviated as flows henceforth). Consider a relay R. Let $N_R$ be the subset of R's neighbors that is within the transmission range of R. There are then $|N_R|(|N_R|-1)$ possible flows that may cross R. Let F be the number of potential flows that will actually make use of R to communicate. In general, $F \leq |N_R|(|N_R|-1)$. The inequality is due to the fact that the distances between some pairs of nodes may be within the transmission range. The nodes of such a pair can communicate directly with each other. In some embodiments, the associated flow will not use R as a relay for efficiency's sake. Thus, in some embodiments, the scheduling flows require the assistance of the relay R. Let $F_R$ ($|F_R|=F$) be the set of node pairs whose two nodes are outside the transmission range of each other. The notation $F_R=\{(A,B), (B,A), (B,C),(C,B) \ldots \}$ may be used if nodes A and B are outside transmission range, nodes B and C are outside transmission range, and so on. Note that node pairs are ordered, so that (A, B) and (B, A) denote two distinct flows.

The phrase "identifying atom instances" may refer to finding the atom instances in the local network that fit into the templates of the ten atom classes described above. In other embodiments, not all ten atoms may be used or referenced for identification, and instead the omitted atoms may be substituted with traditional transmission patterns (which of course, are not as optimal as the omitted atoms).

With respect to the traffic flow diagram of atom class i, let $M_i$ denote the number of flows in it. Each atom instance could be represented by a set of node pairs, each corresponding to a flow. For example, a particular atom-I (TWRC) instance may be represented, for example, say $a_{I_w}$, by $a_{I_w} = \{(A,B), (B, A)\}$. Let $A_i = \{a_{i_w}, \forall w\}$ be the set of all atom instances of class i in the neighborhood of R. Furthermore, the nodes in $N_R$ may be indexed by $k=1$ to $k=|N_R|$, and let $n_k$ be the $k_{th}$ node. Thus, $A_i$ may be represented in the following form:

$$A_i = \left\{ \underbrace{\{(n_1, n_2), (n_3, n_4) \ldots (n_8, n_7)\}}_{M_i}, \underbrace{\{(n_1, n_2), (n_1, n_3) \ldots (n_4, n_9)\}}_{M_i}, \ldots \right\}.$$

For the overall atom-instance identification algorithm, the input is the flow (node-pair) set $F_R$, and the outputs are ten sets of atom instances, $A_1$ to $A_{10}$, or in other cases are sets equivalent to the number of atom instances considered, e.g. only five atom instances, or seven, etc. The identification process is to find the atom instances that belong to each of the atom classes (e.g. ten classes) based on the given $F_R$.

To find the instances of $A_i$, for each combination of $M_i$ node pairs out of $R_{|F_R|}^{M_i}$ possible combinations in the local network, methods may check whether the $M_i$ node pairs satisfy the CI requirement of PNC atom i. For illustration, in the following, the CI requirement check for atom class V in FIG. 6 is discussed. Here, $M_V=2$. Consider two local flows in $F_R$ chosen for checking: (A, C) and (B, D). Methods may determine if these two flows constitute an instance of atom V by performing the following CI requirement check:

The CI requirement check is divided into connectivity check and interference-free check. For connectivity check, since in some embodiments, relay R and its neighbor nodes are connected by definition, only the connectivity between the peripheral nodes may need to be checked. With reference to the CI-graph of FIG. 6, note that nodes A and D are required to be connected, and nodes B and C are required to be connected. To check this, methods may look at $d_{AD}$ (distance between A and D) and $d_{BC}$ (distance between B and C). In some embodiments, if both $d_{AD}$ and $d_{BC}$ are equal or smaller than the transmission range, they are connected. After the connectivity check, the interference-free requirement is checked. In some embodiments, instead of comparing distances between nodes, a power level received by a receiving node from a transmitting node may be measured instead. Sometimes distances between nodes may not be equivalent to distances between other nodes, due to different transmission mediums, interference, etc. Thus, power levels may be more appropriate in order to determine the connectivity check.

The interference-free requirement check is performed with reference to the CI-graph of FIG. 6 as well. When nodes A and B simultaneously transmit to nodes D and C respectively, it is specified that B's transmission will not interfere with D's "overheard" reception from A, and A's transmission will not interfere with C's "overheard" reception from B. A typical method to determine the interference range of a link is to set an upper-bound distance proportional to the link length (the proportion is typically larger than one). For example, $d_{BD}$ (distance between B and D) may be computed and $d_{AC}$ (distance between A and C) may be computed. In some embodiments, if both $d_{BD}$ and $d_{AC}$ are larger than $\alpha^* d_{AD}$ and $\alpha^* d_{BC}$, respectively, for some $\alpha>1$, then the interference-free requirements are satisfied. Like the connectivity check, in some embodiments, instead of comparing distances between nodes, a power level received between a first pair of nodes may be compared to a power level received between a second pair of nodes. In this case, if the first power level is greater than the second power level multiplied by a scalar factor greater than 1, the interference-free requirement may be satisfied.

If the overall CI-requirement is satisfied, then that particular atom instance may be added, the particular atom instance including the node pairs (A, C) and (B, D) to $A_5$:

$$A_5 = \{[(n_1, n_2), (n_3, n_4)], \ldots, [(A,C), (B,D)]\}.$$

In a similar way, methods can obtain the atom instances of the other nine (or however many considered) PNC atom classes. Based on all the atom instances identified, in some embodiments, a "PNC atom database" may be constructed. This database may be represented by an $$|F_R| \times \sum_{i=1}^{10} |A_i|$$

incidence matrix D, in which each column corresponds to an atom instance, each row corresponds to a flow. In D, element $(i, j)=1$ if atom instance j serves flow i, and element $(i, j)=0$ otherwise. In other embodiments, other organizational schemes may be used similar to a database, e.g. a hash table, spreadsheet, linked list, array, etc. In general any construct that may be used to store, catalogue and enumerate all of the atom instances may be suitable, and embodiments are not so limited.

Optimizing Transmission Schedule

Givens and the traffic demands between flows, methods may utilize the knowledge of the identified atom instances in the network and generate an optimal schedule that enumerates a minimum number of time slots to carry out all of the transmission constraints. In some embodiments, the transmission schedule generated has fewer time slots than traditional methods for achieving the same amount of data traffic flow. In some embodiments, such formulations may be generated using an LP. In other embodiments, other optimization techniques may be used, according to persons having ordinary skill in the art.

For example, the following LP is to find the optimal schedule that consumes the least number of time slots to meet the traffic demands:

$$\min_y b^T y \qquad (1)$$

$$\text{s.t.} \quad Dy \geq c, \; y \geq 0$$

where c is an $|F_R| \times 1$ vector whose elements are integers representing the traffic demands of the $|F_R|$ flows crossing R; y is an $$\sum_{i=1}^{10} |A_i| \times 1$$

vector describing the airtime allocated to each of the $$\sum_{i=1}^{10} |A_i|$$

atom instances (i.e., the relative frequency the transmission pattern of an atom instance is executed); b is an $$\sum_{i=1}^{10} |A_i| \times 1$$

vector describing the numbers of time slots required by the transmission patterns of the atom instances.

Example Implementations

Figure 22:
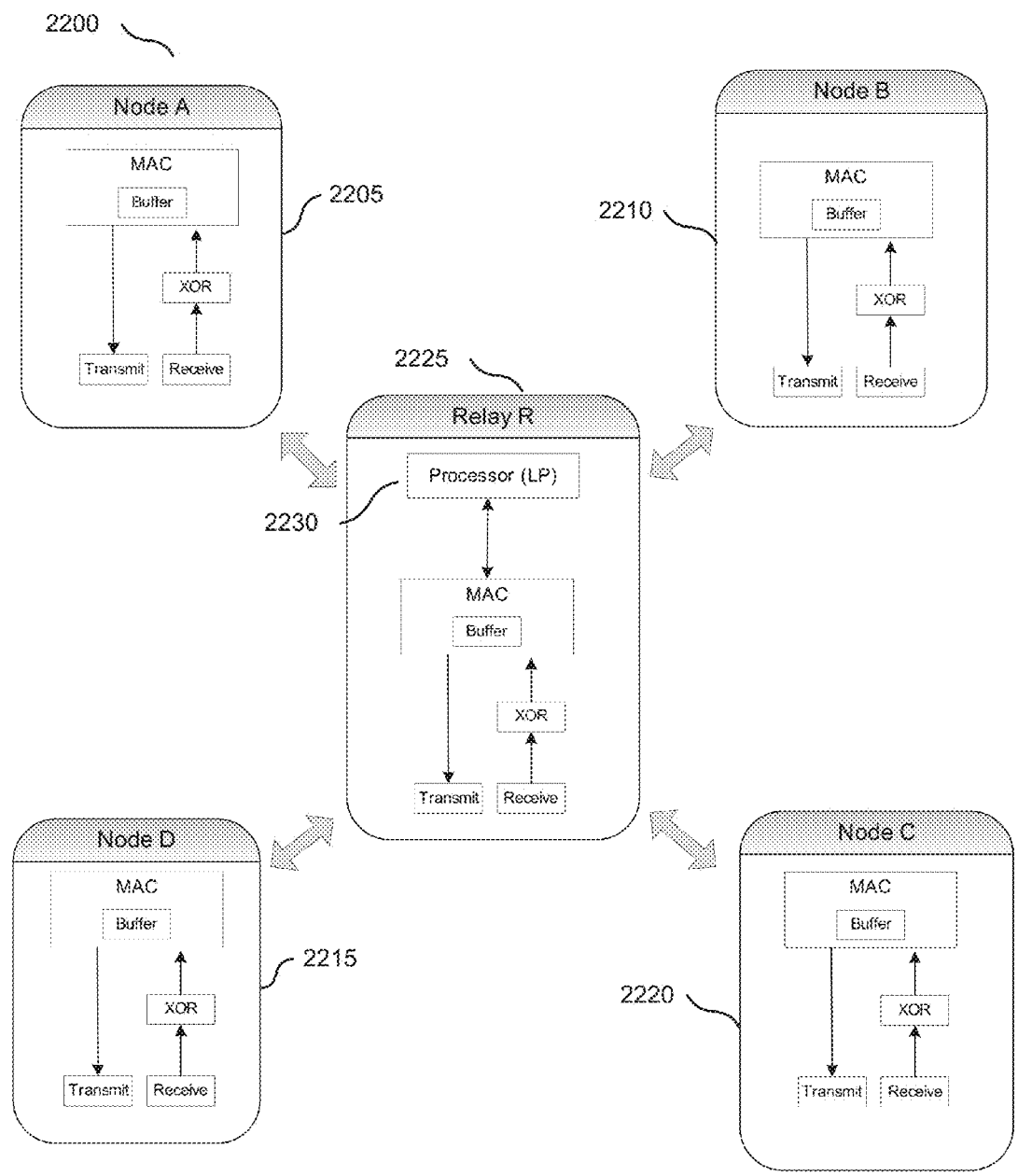
FIG. 22 is an illustration of an example implementation according to some embodiments.

Referring to FIG. 22, example implementation system 2200 illustrates one example of how a network may implement the disclosures herein, according to some embodiments. Here, there may be four peripheral nodes, A (2205), B (2210), C (2215), and D (2220) in the network, with relay R (2225) communicatively coupled to each of the nodes. Each peripheral node may include an input port and an output port, the input port configured to receive digital signals, and the output port configured to transmit digital signals. Here, each node may also include an XOR logic module for extracting certain signals out of the received signals. These signals may then be stored in a multiply-accumulator (MAC) with a buffer, in order to retain the signals. Other implementations of nodes sufficient to perform the methods and satisfy the requirements of the atoms described herein may also be used, and embodiments are not so limited. The relay 2225 may also include a processor capable of generating transmission schedules. In this case, the processor may generate the schedules using LP methods.

In this example, the network 220 may facilitate traffic according to the following steps. 1) Peripheral nodes 2205, 2210, 215, and 2220 send their two-hop traffic demand (routed through the relay) information to the relay 2225. 2) The relay 2225 solves LP to find the optimal atom-instance schedule for the local network. 3) The relay 2225 broadcasts the optimal schedule information to the peripheral nodes 2205, 2210, 215, and 2220 one atom instance by one atom instance to coordinate the transmissions in local network. 4) Each peripheral node gets the command from the relay, indicating that in which period they should act as which node in which atom instance.

Figure 23A:
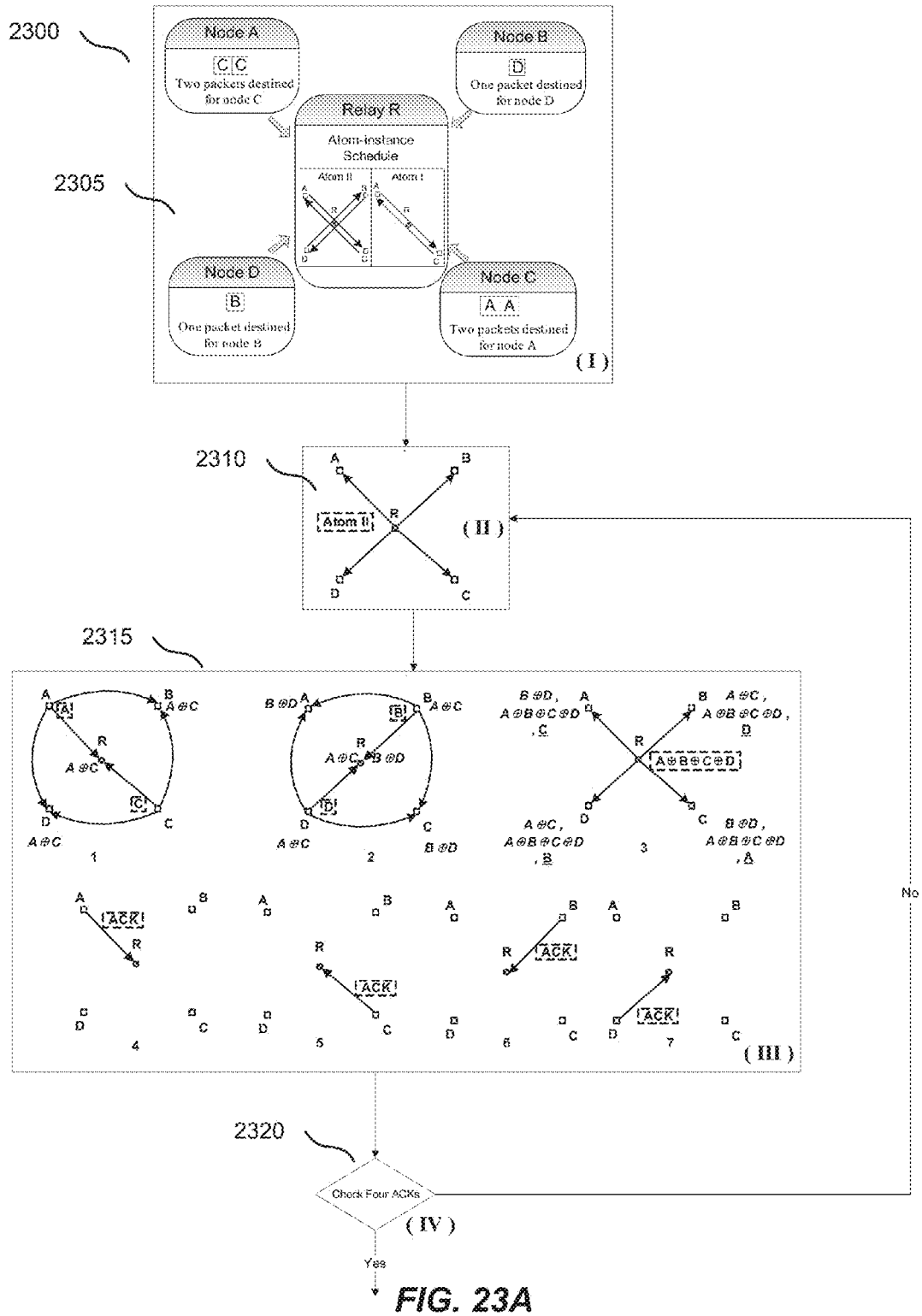
FIG. 23A is an illustration of a first part of an example flow diagram according to some embodiments.
Figure 23B:
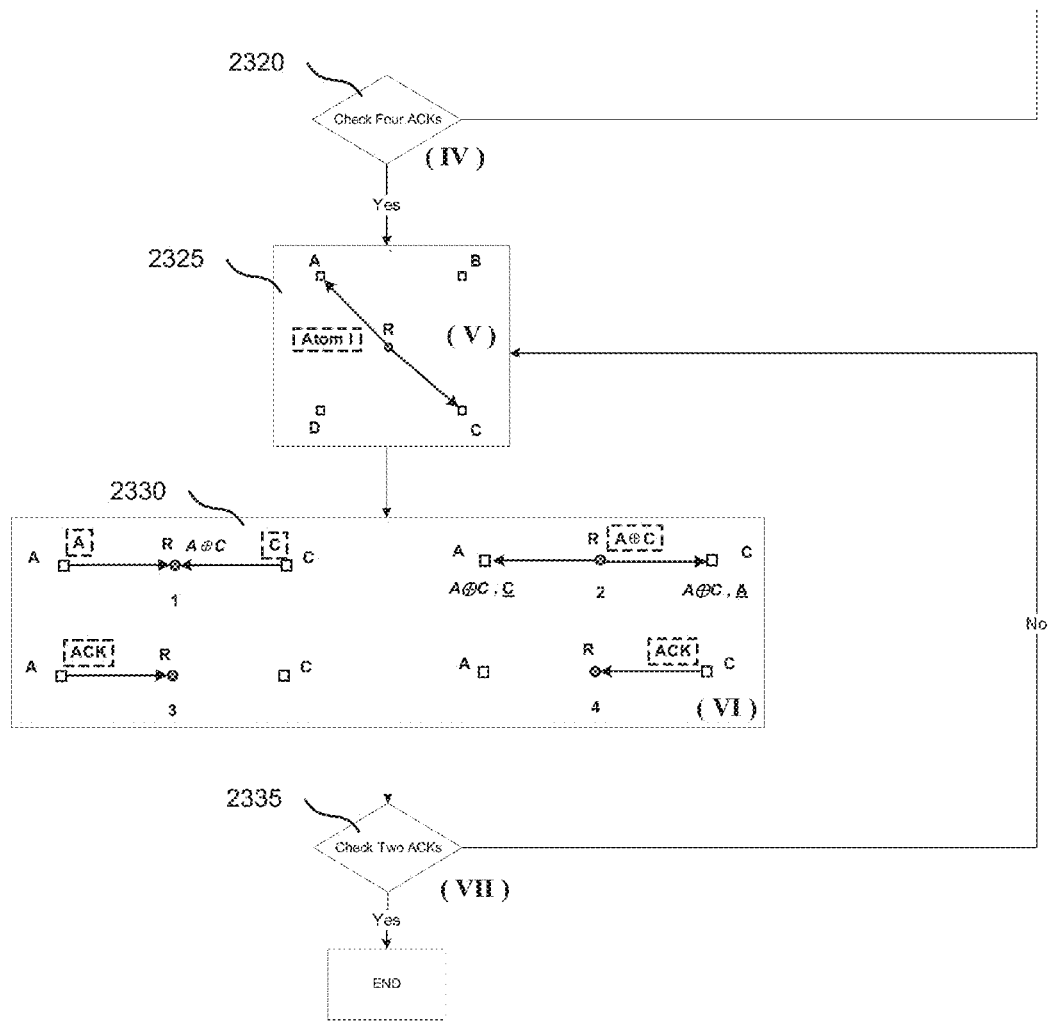
FIG. 23B is an illustration of a second part of an example flow diagram according to some embodiments.

Referring to FIGS. 23A and 23B, flowchart 2300 describes a more detailed example methodology for conducting traffic according to a transmission schedule using the atoms described herein.

In general, there are two parts to this example implementation: A) the determination of the overall transmission schedule (which includes individual transmission patterns of individual atom instances); B) the execution of the transmission schedule and the associated ARQ error control to ensure reliable communication.

Part A) of the above is illustrated in block (I) (block 2305) of the above flowchart. Part B) is illustrated in blocks (II) (2310) to (VII) (2335). In the above example, one execution of part A) is followed by one execution of part B). In general, each execution of part A) may be followed by multiple rounds of execution of part B). That is, the "end" block in the flowchart may loop back to block (II) (2310) repeatedly. In this way, part A) may be executed less frequently than part B).

In the example in the flowchart, it is noted that in the local network there is a relay R and four peripheral nodes A, B, C, and D.

Starting at block 2305, each peripheral node must first discover their neighbors (i.e., who they can hear), and the traffic volume from it to other peripheral nodes. This information will be conveyed to the relay R. For example, the information conveyed by node A to relay R includes $N_A$ and $(T_{AB}, T_{AC}, T_{AD})$ where $N_A$ are the set of neighbors that node A can hear and $T_{ij}$ is the traffic volume from node i to node j. In the above example, there are two units of traffic from A to C, and A does not have traffic for other peripheral nodes. Thus, $T_{AB}=0$, $T_{Ac}=2$, $T_{AD}=0$. Node A has only one neighbor C. Thus, $N_A=\{B,D,R\}$.

Based on the information from the peripheral nodes, the relay R then forms the graph describing the connectivity between the peripheral nodes, then computes the atom-instance database (discussed above) that contain a listing of all atom instances identified. For example, the relay R identifies two atom instances in the above example: an instance of atom type I and an instance of atom type II. After that, it computes how many times each atom instance is to be activated in the overall transmission schedule in order to satisfy the traffic demands between the peripheral nodes. The computation may be done by the LP (Linear Program) described above. In the above example, it is determined that the atom II should be executed once and the atom I should be executed once. The relay R will inform the peripheral nodes the atom instance in which it will participate before the transmission schedule is put into effect.

Blocks (II) (2310) to (VII) (2335) describe the execution of the transmission schedule and the associated ARQ mechanism.

At block 2310, relay R sends a beacon signal to nodes A, B, C, and D informing them that the transmission pattern of the atom II instance will be executed next.

At block 2315, each peripheral transmits according to the three-time-slot transmission pattern of the atom. At the end, each peripheral node sends back an ACK (one-by-one) to the relay.

At block 2320, the relay checks if all peripheral nodes already sent back a positive ACK signaling that they have received their desired packet successfully. If yes, the next block will be executed. If not, go back to block (II) (2310).

Referring now to FIG. 23B, and at block 2325, the relay sends a beacon signal to nodes A and C informing that the transmission pattern of the atom I instance will be executed next.

Thus, at block 2330 and 2335, a similar process to blocks 2315 and 2320 are performed, except here they are for atom instance I.

The process may end once all the desired traffic communications have been transmitted according to the schedule specified at the relay.

V. Advantages

This section stresses at least some of the significant advantages of the present disclosures over known methods in the art. Some of the advantages may be shown quantitatively, and may be illustrated using a performance study of the basic decomposition method described above and its simplifying variants. Described herein is one example simulation used to generate results that may show clear performance advantages over known techniques in the art.

Simulation Setup

In one series of simulations, 20 local networks may be generated and may be used to evaluate the performance of different decomposition schemes. For each network, $N_R=30$ nodes may be generated that are randomly distributed between two concentric circles of radii 1 and 0.5 centered on the relay. The present simulations with different inner radius $r_i$ (from 0.1 to 0.9) yield results that are insensitive to $r_i$ (fluctuations are within 5%). Section VI discusses an explanation. Because of the insensitivity to $r_i$, the results presented are of $r_i$=0.5 only.

Given a network, K units of traffic may be generated, and each unit may be randomly assigned to one of the $|F_R|$ node pairs. 20 such random assignments may be generated for each network. Since 20 networks are explored herein, this results in 400 experiments for each K. Below, additional results shown which are averaged over the 400 experiments. The disclosures herein focus on K=10, 100, and 1000, representing the low, medium, and heavy traffic scenarios.

To identify the possible flows and the PNC atom instances, following methodologies described in Section IV, above, the transmission range specified is one unit and the interference range is 1.78*link length (e.g. a typical setup with wireless-path loss exponent of 4 and SIR requirement of 10 dB).

Comparison of Different Decomposition Schemes

Referring to FIG. 24, a first set of results is presented at 2400. The numbers of time slots (TS) needed for different schemes under K=10, 100, and 1000 are given. Recall that for each K, 400 experiments were run. Accordingly, the mean (Mean) and the relative standard deviation (RSD) of the samples are collected.

In Table 2400, PNC-10 refers to decomposition using all the ten PNC atom classes; PNC-TWRC refers to decomposition using the PNC TWRC atom class only; and Non-NC refers to the traditional scheme in which network coding is not used. The ten atom classes modified for SNC is also analyzed. There are two main differences between SNC and PNC atoms: 1) SNC atom consumes more time slots, e.g., SNC TWRC requires three time slots; 2) there is no interference-free requirement in the SNC atoms.

As shown in Table 2400, PNC-10 has significantly better performance than the other schemes under light, medium and heavy traffic loading K. In particular, for K=100 and 1000, the transmission efficiency of PNC-10 is about twice that of Non-NC (100% throughput gain). That is because when K is large, the scheduling can be decomposed into numerous PNC atoms to fully exploit the advantages of PNC scheduling.

It has been previously shown that the throughput gain of PNC in TWRC is 100%. The throughput gains of other PNC atoms can be derived from the data in FIG. 20. It can be seen from FIG. 20 that the ratios of the numbers of time slots of the PNC atoms and Non-NC atoms range from 4:6 to 3:8, corresponding to throughput gains ranging from 50% to 167%. Since the throughput gain of a local network according to Table 2400 is in the ballpark of 100%, it can be seen that the "micro" throughput gains of individual atoms are largely translated to the "macro" throughput gain of the overall network under the PNC decomposition scheme.

Simplification

Although PNC-10 has the best performance, the scheme may be more complex than other schemes. Two methods are presented herein to simplify it with the goal of maintaining similar or nearly similar performance.

Reduce the Atom Classes to be Identified

In the LP example described above, the atom database matrix D comprises the atom instances of all ten atom classes. However, to identify the instances of atoms V to X, besides the connectivity requirement, the interference-free requirement should also be checked. Meanwhile, to identify atoms I to IV, only the connectivity requirement need be checked. In the interference-free check, the relationship between the desired signal and the interference signal should be checked, so an interference model may need to be introduced, which requires additional assumptions as to how interferences arise. In practice, the validity of the interference model depends much on many subtle physical situations. If the disclosed decomposition strategy does not have such dependency, it will be more robust. An interesting question is whether decomposition based on atoms I to IV only (which do not impose any interference-free requirement) is good enough. An added advantage, of course, is that there will be fewer atoms to be identified, and thus the algorithm can be speeded up. A potential disadvantage, however, is that the performance may degrade.

Referring to FIG. 25, Table 2500 summarizes a second set of simulation results. It shows the performances of PNC-4 (which uses atoms I to IV only) and PNC-10 (which uses atoms I to X). It can be seen that there are appreciable performance gaps between PNC-4 and PNC-10 under light and medium traffic loadings (e.g., more than 50% increase in the number of time slots required for K=100), although the penalty is smaller for K=1000. Thus, getting rid of atoms V to X may have some advantages but also may not be categorically superior to leaving them in.

In some embodiments, just one more atom class with the interference-free requirement may be added. After running simulations with each of the six atoms with the interference-free requirement, it can be seen that adding atom V achieves a significant gain. Table 2500 shows that PNC-5, in which atoms I to V are used, is almost as good as the full-scale PNC-10.

Reduce the Size of the Atom Database Matrix in LP

A second simplification method is now described, that reduces the number of atom instances in the LP further. Specifically, included only are those atom instances in which there is actual traffic demand on all the flows in their flow diagram. This can be illustrated with the atom in FIG. 3, where there are four flows. Suppose that in this scheduling problem, there are traffic demands for three of the flows only: node A to node C, node C to node A, and node B to node D. That is, there is no traffic from node D to node B. In the original LP, above, such an atom instance will be included in D, and in the simplified method here, it will not be included.

Denote the reduced matrix by $\bar{D}$. Returning to the example in the preceding paragraph, since the atom-II instance is not included, one could use an atom-I instance to carry the symmetric traffic from A to C and from C to A. That leaves the outstanding traffic from B to D. For that, one could just use the two-hop non-NC scheme to transport the traffic from B to R, then from R to D, in two time slots.

Note that the construction of $\bar{D}$ can actually be faster than the construction of D. One may simply eliminate from $F_R$ the flows that have no traffic demands when constructing $\bar{D}$. This could result in a much smaller value for $C_{|F_R|}^{M_i}$ as mentioned in the Section IV, when many node pairs in the local network do not have traffic. As per the discussion in the preceding paragraph, it is not needed to add non-NC atoms that have traffic demands as additional columns for $\bar{D}$.

Simulation results of the aforementioned simplification, as shown in Table 2510, seem to indicate that any degradation is negligible in general local networks. Meanwhile, the number of atom instances (AI) in the atom database decreases by two (three) orders of magnitude for K=100 (K=10). When K=100, compared with PNC-10, PNC-R reduces the computation time of the LP from 0.4 s to 0.03 s under the same computation set-up.

VI. Verifications

This section provides verifications to establish with proof some of the assertions described herein.

Optimality of Transmission Patterns

In this sub-section, it is shown that the ten PNC atom classes in FIGS. 2-11 are optimal in the sense that their transmission patterns consume the minimum numbers of time slots given their topological structures. Recall that in designing the transmission pattern, one relies on the connectivity and interference-free relationships given in the CI-graph. This assertion is also established in the analysis presented herein. For example, when the phrase "two nodes cannot hear each other" is used, it means there is no C-edge between the two nodes in the CI-graph, and therefore the transmission pattern cannot assume that they can hear each other.

In the following, when the phrase "the information about packet $S_i$" is used, it means either the native packet $S_i$ or a mixed packet of the form $S_i \oplus$ some other packets. Essentially, each reception by a node gives the node a linear XOR equation. A node does not have the information about packet $S_i$ means none of the equations it has contains $S_i$.

It is noted that the fact that destination $D_i$ cannot directly receive from its source node $S_i$ does not imply that $D_i$ cannot obtain any information about its desired packet $S_i$ during the uplink phase. The information about S can be propagated by other source nodes to $D_i$ in the time slots subsequent to the time slot in which node $S_i$ transmits information about packet $S_i$. That is, $D_i$ could potentially obtain the information about $S_i$ through overhearing other source nodes.

Proposition A.1:

The number of time slots needed for a PNC atom to deliver one packet for each flow is lower bounded by $\lceil N/2 \rceil + 1$, where N is the number of source nodes in the atom.

Proof:

Recall that the transmission process may be divided into uplink phase and downlink phase. For practicality and simplicity, it is reasoned that relay R can receive from at most two nodes at one time. Therefore, at least $\lceil N/2 \rceil$ time slots are needed for the uplink phase. For the downlink phase, at least one time slot is needed. To see this, consider a source node $S_i$ that transmits in the last of the $\lceil N/2 \rceil$ uplink time slots. The corresponding destination node $D_i$ cannot hear the packet $S_i$. Meanwhile, there are no uplink time slots left for information about packet $S_i$ to propagate through the transmissions of other source nodes to $D_i$. Thus, the assistance of the relay R is therefore needed to forward information related to packet $S_i$, establishing Proposition A.1.

Atoms that require $\lceil N/2 \rceil + 1$ time slots: Atoms I, II, V, VII, IX, and X in FIGS. 2-11 consume $\lceil N/2 \rceil + 1$ time slots, achieving the above lower bound.

Atoms that require $\lceil N/2 \rceil + 2$ time slots: Atoms III, IV, VI and VIII in FIGS. 2-11 consume $\lceil N/2 \rceil + 2$ time slots. However, their topological structures are such that this is necessarily so. That is, the achievable lower bound for these atoms must be no less than $\lceil N/2 \rceil + 2$. This is captured in Propositions A.2 and A.3 below.

Proposition A.2:

Consider a PNC atom with N source nodes. Suppose that 1) each and every source, besides not being heard by its own destination, cannot be overheard by at least one other destination node during the uplink phase; and that 2) the topological structure of the atom is such that it is not possible for each and every destination to obtain any information about its desired packet at the end of the uplink phase if the uplink phase has only $\lceil N/2 \rceil$ time slots. Then $\lceil N/2 \rceil + 2$ time slots are needed to deliver one packet for each flow.

Proof:

As explained in the proof of Proposition A.1, the number of time slots required for the uplink phase is lower-bounded by $\lceil N/2 \rceil$, and in each time slot at most two sources transmit. This means that at least one source must transmit for the first time in the last of the $\lceil N/2 \rceil$ time slots. Let this source node be denoted by $S_i$. By supposition 1), this source node, besides not being heard by its destination $D_i$, cannot be overheard by another destination node, say $D_j$. Let the desired packet of $D_j$ be denoted by $s_j$. Both $D_i$ and $D_j$ do not have any information about packet $S_i$ at the end of the uplink phase, since they cannot directly overhear node $S_i$, and node $S_i$ transmits in the last uplink time slot. By supposition 2), $D_j$ does not have information about its desired packet $S_j$ either by the end of the uplink phase. Now, suppose that relay R uses only one time slot for the downlink phase. The above implies that the relay must transmit a network-coded packet in the form of $S_i \oplus S_j$ or $S_i \oplus S_j \oplus$ some other packets in order that nodes $D_i$ and $D_j$ could obtain some information about their desired packets $S_i$ and $S_j$, respectively. However, since node $D_j$ does not have any information about $S_i$ from the uplink phase receptions, it cannot cancel out $S_i$ from the network-coded packet transmitted by R to obtain $S_j$. Thus, at least two time slots are needed for the downlink phase given suppositions 1) and 2), establishing Proposition A.2.

Suppositions 1) and 2) are true in PNC atoms III, IV, and VI. Thus, they need at least $\lceil N/2 \rceil + 2$ time slots. For illustration, consider atom VI, in which N=3. It is easy to verify from the CI-graph in FIG. 7 that supposition 1) applies. As for supposition 2), note that $\lceil N/2 \rceil = \lceil 3/2 \rceil = 2$. Consider the source-destination pair (A, D). Not including R, node D is three hops away from node A. Thus, given that there are only two time slots in the uplink phase, it is impossible for the information about packet A to propagate to node D by the end of the uplink phase. Similar argument applies for pairs (B, E) and (C, F).

The remaining atom is atom VIII. Unfortunately, supposition 2) in Proposition A.2 does not apply to atom VIII. In Proposition A.3 below, it is shown that the topological structure of atom VIII is such that it still requires at least $\lceil N/2 \rceil + 2$ time slots.

Proposition A.3:

The topological structure of atom VIII is such that a minimum of five time slots is needed for the delivery of one packet for each flow.

Proof:

In atom VIII, N=6 and $\lceil N/2 \rceil = 3$. Suppose that the uplink phase uses three time slots (note: this is the minimum number of uplink time slots needed because of the assertion that at most two sources can transmit in the same time slot) and the downlink phase uses just one time slot for a total of four time slots. In the following, it is shown that no matter how the transmissions in atom VIII is scheduled, it is not possible to use only four time slots.

Not including R, the destination of each source is three hops away from the source. This means that it will be possible for the information of a source packet to propagate to its destination in the three uplink time slots only if the corresponding source node transmits in the first time slot. However, only two of the sources can transmit in the first time slot. Among the six sources, two (denoted by $S_{11}$ and $S_{12}$) transmit in the first time slot, two (denoted by $S_{21}$ and $S_{22}$) transmit in the second time slot, and two (denoted by $S_{31}$ and $S_{32}$) transmit in the third time slot. Since only information about packets $S_{11}$ and $S_{12}$ could propagate to their destinations $D_{11}$ and $D_{12}$ at the end of the uplink phase, if there is only one downlink time slot, R will have no choice but to transmit $S_{21} \oplus S_{22} \oplus S_{31} \oplus S_{32}$ or $S_{21} \oplus S_{22} \oplus S_{31} \oplus S_{32} \oplus$ some other packets so that the other destinations could obtain information about their desired packets. An observation is made below:

Main Observation:

In the second time slot, two sources $S_{21}$ and $S_{22}$ must be selected whose destinations $D_{21}$ and $D_{22}$ can overhear both $S_{31}$ and $S_{32}$ in the third time slot to transmit. This is because $D_{21}$ and $D_{22}$ must be able to eliminate $S_{31} \oplus S_{32}$ from the transmission by R to obtain their desired packets $S_{21}$ and $S_{22}$ respectively.

Now, not including R, there are three possible relative position relationships between $S_{31}$ and $S_{32}$ in atom VIII: 1) $S_{31}$ and $S_{32}$ are separated by three hops; 2) $S_{31}$ and $S_{32}$ are separated by two hops; and 3) $S_{31}$ and $S_{32}$ are separated by one hop. In the following, for each of the three cases, it is analyzed whether there could be the two sources to transmit in the second time slot in order to satisfy the requirement as per the main observation above:

Without loss of generality, suppose that $S_{31}$ and $S_{32}$ are sources A and D. The destinations $D_{31}$ and $D_{32}$ are then respectively D and A. Consider the other four destinations, B, C, E, and F (their respective sources are E, F, B, and C). Destinations B and C cannot overhear D, and destination E and F cannot overhear A. None of them can overhear both sources A and D. Thus, no matter which two sources among E, F, B, and C we choose to transmit in the second time slot, the requirement of the main observation above cannot be satisfied.

Without loss of generality, suppose that $S_{31}$ and $S_{32}$ are sources A and F. The destinations $D_{31}$ and $D_{32}$ are respectively D and C. Consider the other four destinations, A, F, E, and B (their respective sources are D, C, B, and E). Destination A cannot overhear F, destination F cannot overhear A, and destination E cannot overhear both A and F. Only destination B can overhear both A and F. Thus, no matter which two sources among D, C, B, and E chosen to transmit in the second time slot, the main observation above cannot be satisfied.

Without loss of generality, suppose that $S_{31}$ and $S_{32}$ are sources A and B. The destinations $D_{31}$ and $D_{32}$ are respectively D and E. Consider the four destinations, C, F, A, and B (their respective sources are F, C, D, and E). Destination C cannot overhear B, destination F cannot overhear A. Although destination A is within the transmission range of source B, they transmit in the same time slot. Since half duplexity is a common premise in the context of these disclosures, destination A cannot overhear B, and destination B cannot overhear A. None of them can overhear both sources A and B. Thus, no matter which two sources among F, C, D, and E we choose to transmit in the second time slot, the main observation above cannot be satisfied, and thus Proposition A.3 is established.

Insensitivity to Inner Radius

The insensitivity of the simulation results discussed herein to the inner radius can be explained as follows: First, when $r_i$ is small, since the nodes are randomly distributed, only a few nodes would be mapped into the area near the circle center. Second, perhaps more importantly, the problem definition requires that the distance between two peripheral nodes with traffic between them to be larger than one unit. This is to ascertain that the two nodes do indeed need the assistance of the relay R to forward the traffic between them. Consider a node A that is placed close to R. Draw a circle of radius one around A and another circle of radius one around R. Then the area of the latter circle that is not overlapping with the area of the former circle is the area where a node with traffic to or from A might be placed. Since A is near R, the non-overlapping area is very small. Thus a node such as A that is near R will have little traffic to be relayed by R. Hence, even if the inner radius is allowed to be small, most traffic flows would be between nodes at a distance further away from R. This explains the insensitivity of our results to the setting of the inner radius.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A data communication method comprising:
   identifying a plurality of physical-layer network coding (PNC) atoms in a digital telecommunications network, the digital telecommunications network comprising a plurality of nodes and at least one relay, each of the plurality of PNC atoms comprising:
a transmission pattern attribute,
at least some of the plurality of nodes, and
the at least one relay in the network,
wherein each transmission pattern attribute of the plurality of PNC atoms cannot be decomposed to any other transmission pattern attribute of the PNC atoms;
wherein each of the plurality of PNC atoms specifies how traffic flows between the plurality of nodes and the at least one relay using the transmission pattern attribute;
generating a transmission schedule using the plurality of PNC atoms based at least in part on the transmission pattern attribute of at least some of the PNC atoms; and
relaying traffic between the plurality of nodes and the at least one relay, using the transmission schedule.

2. A data communication method comprising:
identifying a plurality of straight-forward network coding (SNC) atoms in a digital telecommunications network, the digital telecommunications network comprising a plurality of nodes and at least one relay,
each of the plurality of SNC atoms comprising:
a transmission pattern attribute, the transmission pattern attribute comprising a schedule that specifies at least two time slots for transmission to the at least one relay of selected packets associated with its specific SNC atom,
at least some of the plurality of nodes, and
the at least one relay in the network,
wherein each transmission pattern attribute of the plurality of SNC atoms cannot be decomposed into any other transmission pattern attribute of the SNC atoms, such that each transmission pattern attribute is an indivisible unit associated with its specific SNC atom;
wherein each of the plurality of SNC atoms specifies how traffic flows between the plurality of nodes and the at least one relay using the transmission pattern attribute;
generating a transmission schedule using the plurality of SNC atoms based at least in part on the transmission pattern attribute of at least some of the SNC atoms; and
relaying traffic between the plurality of nodes and the at least one relay, using the transmission schedule.

3. The method of claim 2, wherein each of the plurality of SNC atoms further comprises a traffic flow attribute.

4. The method of claim 2, wherein the plurality of SNC atoms comprises at least one of: a bidirectional cross atom, a triangle atom, a wedge atom, a cross atom, an asymmetric star atom, a symmetric star atom, a bidirectional star atom, a first special two way relay channel atom, and a second special two way relay channel atom.

5. The method of claim 2, wherein generating the transmission schedule comprises determining as few time slots as necessary to schedule traffic between the plurality of nodes.

6. The method of claim 2, wherein identifying the plurality of SNC atoms comprises, for each of the plurality of SNC atoms identified, determining whether a combination of node pairs among the plurality of nodes in the network satisfies a connectivity requirement.

7. The method of claim 6, wherein determining whether the combination of node pairs satisfies the connectivity requirement comprises performing a connectivity check.

8. The method of claim 7, wherein performing the connectivity check comprises determining whether a subset of nodes of the at least some of the plurality of nodes are connected to each other without requiring transmission through the at least one relay.

9. The method of claim 7, wherein performing the connectivity check comprises determining whether a distance between nodes of the at least some of the plurality of nodes is smaller than or equal to a transmission range threshold.

10. The method of claim 7, wherein performing the connectivity check comprises determining whether a power value received between a receiving node and a transmitting node of the at least some of the plurality of nodes exceeds a transmission power threshold.

11. The method of claim 2, wherein generating the transmission schedule comprises storing information about each of the plurality of SNC atoms in a database.

12. The method of claim 11, wherein generating the transmission schedule further comprises computing a linear program utilizing the database of the plurality of SNC atoms subject to constraints to minimize a number of time slots needed to meet traffic demand.

13. A communication system comprising:
a digital telecommunications network comprising:
a plurality of straight-forward network coding (SNC) nodes;
a plurality of nodes, each of the plurality of nodes configured to transmit and receive signals from other nodes in the plurality of nodes;
at least one relay, communicatively connected to each of the plurality of nodes, and configured to relay signals transmitted from the plurality of nodes to the other nodes of the plurality of nodes; and
a processor communicatively coupled to the network, and configured to:
identify a plurality of straight-forward network coding (SNC) atoms in the network;
wherein each of the plurality of SNC atoms comprises:
a transmission pattern attribute, the transmission pattern attribute comprising a schedule that specifies at least two time slots for transmission to the at least one relay of selected packets associated with its specific SNC atom,
at least some of the plurality of nodes, and
the at least one relay in the network,
wherein each transmission pattern attribute of the plurality of SNC atoms cannot be decomposed into any other transmission pattern attribute of the SNC atoms, such that each transmission pattern attribute is an indivisible unit associated with its specific SNC atom;
wherein each of the plurality of SNC atoms specifies how traffic flows between the plurality of nodes and the at least one relay using the transmission pattern attribute;
generate a transmission schedule using the plurality of SNC atoms based at least in part on the transmission pattern attribute of at least some of the SNC atoms; and
relay transmission traffic between the plurality of nodes and the at least one relay, using the transmission schedule.

14. The communication system of claim 13, wherein the plurality of SNC atoms comprises at least one of: a bidirectional cross atom, a triangle atom, a wedge atom, a cross atom, an asymmetric star atom, a symmetric star atom, a bidirectional star atom, a first special two way relay channel atom, and a second special two way relay channel atom.

15. A data communication method comprising:
identifying at least one relay in a digital telecommunications network communicatively connected to each of a plurality of nodes in said network;
identifying a plurality of straight-forward network coding (SNC) atoms comprising the at least one relay and at least some of the plurality of nodes, the at least one SNC atoms specifying how transmission traffic flows between the at least some of the plurality of nodes and the at least one relay;

generating a transmission schedule, wherein the transmission schedule comprises a first instance of one of the SNC atoms; and relaying traffic across the plurality of nodes by instructing the plurality of nodes to transmit packet information according to a first instance of the SNC atoms.

16. The method of claim 15, wherein the transmission schedule further comprises a second instance of the at least one SNC atom, and the second atom instance is scheduled successively after the first atom instance;

the method further comprising:

verifying the plurality of nodes successfully transmitted packet information according to the first atom instance; and instructing the plurality of nodes to transmit a second packet information according to the second atom instance after verifying successful transmission according to the first atom instance.

17. The method of claim 16, wherein:

the at least one SNC atom comprises a first SNC atom and a second SNC atom that are distinct from one another;

the first atom instance is based on the first SNC atom; and the second atom instance is based on the second SNC atom.

* * * * *